(12) United States Patent
Koo et al.

(10) Patent No.: US 9,386,445 B2
(45) Date of Patent: *Jul. 5, 2016

(54) ELECTRONIC DEVICE, PERSONAL CLOUD APPARATUS, PERSONAL CLOUD SYSTEM AND METHOD FOR REGISTERING PERSONAL CLOUD APPARATUS IN USER PORTAL SERVER THEREOF

(71) Applicant: Samsung Electronics Co., Ltd., Suwon-si, Gyeonggi-do (KR)

(72) Inventors: Bon-hyun Koo, Suwon-si (KR); Ki-eun Shin, Bucheon-si (KR); Kyoung-lae Noh, Hwaseong-si (KR); Su-byeong Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

This patent is subject to a terminal disclaimer.

(21) Appl. No.: 14/136,675

(22) Filed: Dec. 20, 2013

(65) Prior Publication Data

US 2014/0181916 A1    Jun. 26, 2014

(30) Foreign Application Priority Data

Dec. 21, 2012 (KR) .................. 10-2012-0150189

(51) Int. Cl.
*G06F 7/04*  (2006.01)
*G06F 15/16*  (2006.01)
*G06F 17/30*  (2006.01)
(Continued)

(52) U.S. Cl.
CPC ............ *H04W 8/22* (2013.01); *H04L 12/2812* (2013.01); *H04W 4/008* (2013.01); *H04W 8/02* (2013.01); *H04W 12/06* (2013.01); *H04W 12/08* (2013.01); *H04L 67/04* (2013.01)

(58) Field of Classification Search
CPC ....... H04W 8/22; H04W 8/02; H04L 12/2803
USPC ............................................................ 726/4
See application file for complete search history.

(56) References Cited

U.S. PATENT DOCUMENTS 8,407,759 B1    3/2013  Sotos et al.
2011/0307620 A1    12/2011  Park et al.
(Continued)

FOREIGN PATENT DOCUMENTS

KR    10-2012-0072022 A    7/2012
KR    10-2012-0113106 A    10/2012

OTHER PUBLICATIONS

Karthik Kumar; Cloud computing for mobile user; 2002; IEEE; p. 1-24.*

*Primary Examiner* — Monjour Rahim
(74) *Attorney, Agent, or Firm* — Jefferson IP Law, LLP

(57) ABSTRACT

An electronic device, a personal cloud apparatus, a personal cloud system, and a method thereof for registering personal cloud apparatus are provided. The method of the electronic device for registering the personal cloud apparatus includes pairing with the personal cloud apparatus when an application is executed, acquiring information about an access point and transmitting the same to the personal cloud apparatus to connect the personal cloud apparatus to a network, and registering the personal cloud apparatus to a registration server, when the personal cloud apparatus is connected to the network via the access point. As a result, users are able to upload or download various contents using the personal cloud apparatus, inside or outside the house.

20 Claims, 19 Drawing Sheets

(51) Int. Cl.
*H04L 29/06* (2006.01)
*H04W 8/22* (2009.01)
*H04W 12/08* (2009.01)
*H04W 12/06* (2009.01)
*H04L 12/28* (2006.01)
*H04W 4/00* (2009.01)
*H04W 8/02* (2009.01)
*H04L 29/08* (2006.01)

(56) References Cited

U.S. PATENT DOCUMENTS

2012/0066373 A1* 3/2012 Ochoa et al. .................. 709/224
2012/0066670 A1 3/2012 McCarthy et al.
2012/0166538 A1 6/2012 Son et al.
2012/0167185 A1 6/2012 Menezes et al.
2012/0265803 A1* 10/2012 Ha et al. ........................ 709/203
2012/0329429 A1* 12/2012 Jabara et al. .................. 455/411
2013/0046982 A1* 2/2013 Suh et al. ....................... 713/171
2013/0067550 A1* 3/2013 Chen et al. ............... H04L 67/10
 726/7
2013/0086245 A1* 4/2013 Lu et al. ........................ 709/223
2013/0254519 A1 9/2013 Benoit et al.
2014/0137188 A1* 5/2014 Bartholomay et al. ........... 726/3
2014/0173692 A1* 6/2014 Srinivasan et al. ................ 726/4

* cited by examiner

FIG. 9

| USER ACCOUNT "A" | USER ACCOUNT "B" |
|---|---|
| `<Header>`<br>x-osp-appId: gya5fuofe0<br>x-osp-userId: ackiqczh5b<br>oauth_consumer_key=gya5fuofe0,<br>oauth_token=A11YJsnRc1<br>oauth_timestamp=1334040253,<br>oauth_nonce=d2317afc25434a27ba5f50b0ffcaa2a5,<br>oauth_version=1.0,<br>oauth_signature=o1TPpWnmK8ZlsJNL39KtIhsa8HY= | `<Header>`<br>x-osp-appId: gya5fuofe0<br>x-osp-userId: guinoevz0p<br>oauth_consumer_key=gya5fuofe0,<br>oauth_token=B13DBopCb1<br>oauth_timestamp=1334040253,<br>oauth_nonce=d2317afc25434a27ba5f50b0ffcaa2a5,<br>oauth_version=1.0,<br>oauth_signature=o1TPpWnmK8ZlsJNL39KtIhsa8HY= |
| `<pcwDevice>`<br>  `<userID>`ackiqczh5b`</userID>`<br>  `<deviceID></deviceID>`<br>  `<deviceTypeCode>`PHONE DEVICE<br>  `</deviceTypeCode>`<br>  `<deviceModelID>`GT-I9100`</deviceModelID>`<br>  `<deviceUniqueID></deviceUniqueID>`<br>  `<devicePhysicalAddressText>`MAC:00000000001<br>  `</devicePhysicalAddressText>`<br>  `<phoneNumberText></phoneNumberText>`<br>  `<mobileCountryCode></mobileCountryCode>`<br>  `<mobileNetworkcode></mobileNetworkcode>`<br>  `<customCode></customCode>`<br>  `<softwareVersion></softwareVersion>`<br>  `<service>`DEVAPP`</service>`<br>`</pcwDevice>` | `<pcwDevice>`<br>  `<userID>`guinoevz0p`</userID>`<br>  `<deviceID></deviceID>`<br>  `<deviceTypeCode>`PHONE DEVICE<br>  `</deviceTypeCode>`<br>  `<deviceModelID>`GT-I9100`</deviceModelID>`<br>  `<deviceUniqueID></deviceUniqueID>`<br>  `<devicePhysicalAddressText>`MAC:00000000001<br>  `</devicePhysicalAddressText>`<br>  `<phoneNumberText></phoneNumberText>`<br>  `<mobileCountryCode></mobileCountryCode>`<br>  `<mobileNetworkcode></mobileNetworkcode>`<br>  `<customCode></customCode>`<br>  `<softwareVersion></softwareVersion>`<br>  `<service>`DEVAPP`</service>`<br>`</pcwDevice>` |

ELECTRONIC DEVICE, PERSONAL CLOUD APPARATUS, PERSONAL CLOUD SYSTEM AND METHOD FOR REGISTERING PERSONAL CLOUD APPARATUS IN USER PORTAL SERVER THEREOF

CROSS-REFERENCE TO RELATED APPLICATION(S)

This application claims the benefit under 35 U.S.C. §119 (a) of a Korean patent application filed on Dec. 21, 2012 in the Korean Intellectual Property Office and assigned Serial 10-2012-0150189, the entire disclosure of which is hereby incorporated by reference.

TECHNICAL FIELD

The present disclosure relates to an electronic device, a personal cloud apparatus, a personal cloud system, and a method thereof for registering a personal cloud apparatus. More particularly, the present disclosure relates to an electronic device, a personal cloud apparatus, and a personal cloud system in which the electronic device is able to access the personal cloud apparatus via a home network or an external network, and store and share contents, and a method for registering the personal cloud apparatus.

BACKGROUND

Combined with the increased amount of contents and fast-advancing communication technologies, the cloud service has recently begun providing download services enabling an electronic device, such as a smart phone, to download the contents anywhere and anytime.

Considering the Public Cloud Service (PCS) of the related art as one example of a cloud service, a fixed infrastructure is provided and a client (e.g., electronic device) can access the server via a fixed internet identifier (e.g., IP address or domain). Further, the Network Attached Storage (NAS) system of the related art is a network system for sharing storage which uses internal or external electronic devices to upload or download the contents for sharing.

For either PCS or NAS, it is necessary for a user to go through an initial process to set up account information to use cloud servers of the related art. This causes an inconvenience to the user who has to perform the initial setup before using the cloud services. When particularly considering the fact that the cloud services of the related art typically use common cloud servers, privacy issue also arises.

Recently, many electronic devices, such as smartphones, smart TVs, tablet PCs, etc. are used in homes. It is therefore increasingly desired that the family members be able to share contents. Given the above, there exists a need for a personal cloud apparatus that a family member can use personally, or all the family can use commonly.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Also, the present inventive concept is not required to overcome the disadvantages described above, and an embodiment of the present inventive concept may not overcome any of the problems described above.

An aspect of the present invention is to provide an electronic device, a personal cloud apparatus, and a personal cloud system to register the personal cloud apparatus to an external registration server so that the electronic device can store and share contents via a network inside a house or an external network using a personal cloud apparatus at home, and a method thereof for registering a personal cloud apparatus.

In accordance with an aspect of the present disclosure, a method of an electronic device for registering a personal cloud apparatus is provided. The method may include pairing with the personal cloud apparatus when an application is executed, acquiring information about an access point, transmitting the information about the access point to the personal cloud apparatus to connect the personal cloud apparatus to a network, and registering the personal cloud apparatus with a registration server when the personal cloud apparatus is connected to the network via the access point.

The method may additionally include the electronic device entering a Near Field Communication (NFC) mode, in response to a user command, when the electronic device is within a threshold distance of the personal cloud apparatus, receiving download information of the application using NFC, and downloading the application based on the download information of the application.

The pairing may include determining whether the electronic device is in a login state with an authentication server using a specific user account, searching available communication interfaces for the pairing with the personal cloud apparatus when determining that the electronic device is in the login state with the authentication server, and pairing with the personal cloud apparatus via one of the searched communication interfaces.

The available communication interfaces may include at least one of a Bluetooth interface, a WiFi interface and a Zigbee interface.

For the pairing with the personal cloud apparatus via a WiFi interface, the pairing may include receiving Service Set IDentifier (SSID) information when the SSID of the personal cloud apparatus is broadcast via the personal cloud apparatus, generating encryption information with a Hash algorithm using the SSID information and MAC address information of the personal cloud apparatus, and pairing with the personal cloud apparatus based on the SSID information and the encryption information.

For the pairing with the personal cloud apparatus via a Bluetooth interface, the pairing may include performing a discovery operation to search for personal cloud apparatuses existing within a threshold distance of the electronic device, receiving MAC address information from the personal cloud apparatus in response to a request for pairing with the searched personal cloud apparatus inputted from a user, setting a channel to perform communication with the searched personal cloud apparatus, transmitting a request signal for connection to the personal cloud apparatus via the channel, and receiving a response signal in response to the request signal.

The transmitting may include transmitting SSID information and encryption information of an access point currently used by the electronic device.

The registering may include receiving MAC address information from the personal cloud apparatus, receiving user account information from an authentication server when the user account is logged in to the authentication server, transmitting the user account information and the MAC address information to the registration server, to register the personal cloud apparatus when the personal cloud apparatus is registered to the registration server using the user account information and the MAC address information, receiving from the registration server domain information and peer Identification (ID) information of a network server to which the personal cloud apparatus can connect, and transmitting the received domain information and peer ID information to the personal cloud apparatus.

The personal cloud apparatus may be connected to an external network via the network server using the received domain information and peer ID information, and the peer ID information corresponds to MAC address information of the personal cloud apparatus.

The registering may include registering the personal cloud apparatus to the registration server based on a user account. When a plurality of user accounts register the same personal cloud apparatus to the registration server, a plurality of electronic devices using the plurality of user accounts share the personal cloud apparatus.

In accordance with another aspect of the present disclosure, an electronic device is provided. The electronic device includes a communicator configured to perform communication with a personal cloud apparatus and an external server, a storage, and a controller configured to perform pairing with a personal cloud apparatus, to acquire information of an access point to connect the personal cloud apparatus to a network, and to control the communicator to transmit the acquired information to the personal cloud apparatus when an application is executed, and to register the personal cloud apparatus to a registration server when the personal cloud apparatus is connected to the network via the access point.

The controller causes the electronic device to enter an NFC mode in response to a user command, and when the electronic device is within a threshold distance to the personal cloud apparatus, receives download information of the application using the NFC, and downloads the application based on the download information of the application and stores the same at the storage.

The controller determines as to whether it is in a login state with an authentication server using a specific user account, and when it is in the login state with the authentication server, to perform pairing with the personal cloud apparatus, searches available communication interfaces and pairs with the personal cloud apparatus via one of the searched communication interfaces.

The available communication interfaces may include at least one of a Bluetooth interface, a WiFi interface and a Zigbee interface.

For the pairing with the personal cloud apparatus via a WiFi interface, the controller receives SSID information via the communicator, when the SSID of the personal cloud apparatus is broadcast via the personal cloud apparatus, generates encryption information with a Hash algorithm using the SSID information and MAC address information of the personal cloud apparatus, and pairs with the personal cloud apparatus based on the SSID information and the encryption information.

For the pairing with the personal cloud apparatus via a Bluetooth interface, the controller performs a discovery operation to search for personal cloud apparatuses existing within a threshold distance of the electronic device, receives MAC address information from the searched personal cloud apparatus, and in response to a request for pairing with the searched personal cloud apparatus inputted from a user, sets a channel to perform communication with the searched personal cloud apparatus, transmits a request signal for connection to the personal cloud apparatus via the channel, and controls the communicator to receive a response signal in response to the request signal.

The controller controls the communicator to transmit SSID information and encryption information of an access point currently used by the electronic device to the personal cloud apparatus.

The controller receives MAC address information from the personal cloud apparatus, and when the user account is logged in to an authentication server, receives user account information from the authentication server and transmits the user account information and the MAC address information to the registration server to register the personal cloud apparatus, and when the personal cloud apparatus is registered to the registration server using the user account information and MAC address information, receives domain information and peer ID information of a network server to which the personal cloud apparatus can connect, and controls the communicator to transmit the received domain information and peer ID information to the personal cloud apparatus.

The personal cloud apparatus is connected to an external network via the network server using the received domain information and peer ID information, and the peer ID information corresponds to MAC address information of the personal cloud apparatus.

The personal cloud apparatus is registered to the registration server based on a user account, and when a plurality of user accounts register the same personal cloud apparatus to the registration server, a plurality of electronic devices using the plurality of user accounts share the personal cloud apparatus.

In accordance with an aspect of the present disclosure, a method of a personal cloud system for registering a personal cloud apparatus to a registration server is provided. The method includes pairing an electronic device with the personal cloud apparatus when an application of the electronic device is executed and a button of the personal cloud apparatus is selected, acquiring, at the electronic device, information of an access point from the access point, to connect the personal cloud apparatus to a network, transmitting, at the electronic device, the information of the access point to the personal cloud apparatus, connecting, at the personal cloud apparatus, to the access point using the information of the access point, transmitting, at the electronic device, user account information and information of the personal cloud apparatus to the registration server to register the personal cloud apparatus to the registration server, registering, at the registration server, the personal cloud apparatus, and transmitting domain information and peer ID information of a network server to which the personal cloud apparatus can connect, to the electronic device.

In accordance with an aspect of the present disclosure, a method for registering a personal cloud apparatus to a registration server is provided. The method includes pairing with an electronic device when a button provided on the personal cloud apparatus is selected, receiving, from the electronic device, information of an access point, connecting to the access point using the information of the access point, and transmitting MAC address information to the electronic device to register the personal cloud apparatus to the registration server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of the present disclosure will be more apparent from the following description take in conjunction with the accompanying drawings, in which:

FIG. 9 illustrates a registration message format by user account when a same personal cloud apparatus is registered, according to an embodiment of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, various explanations are provided to assist in a comprehensive understanding of the present inventive concept. Accordingly, it is apparent that the embodiments of the present disclosure can be carried out without those specifically defined matters. Also, well-known functions or constructions are not described in detail since they would unnecessarily obscure the disclosure.

Figure 1:
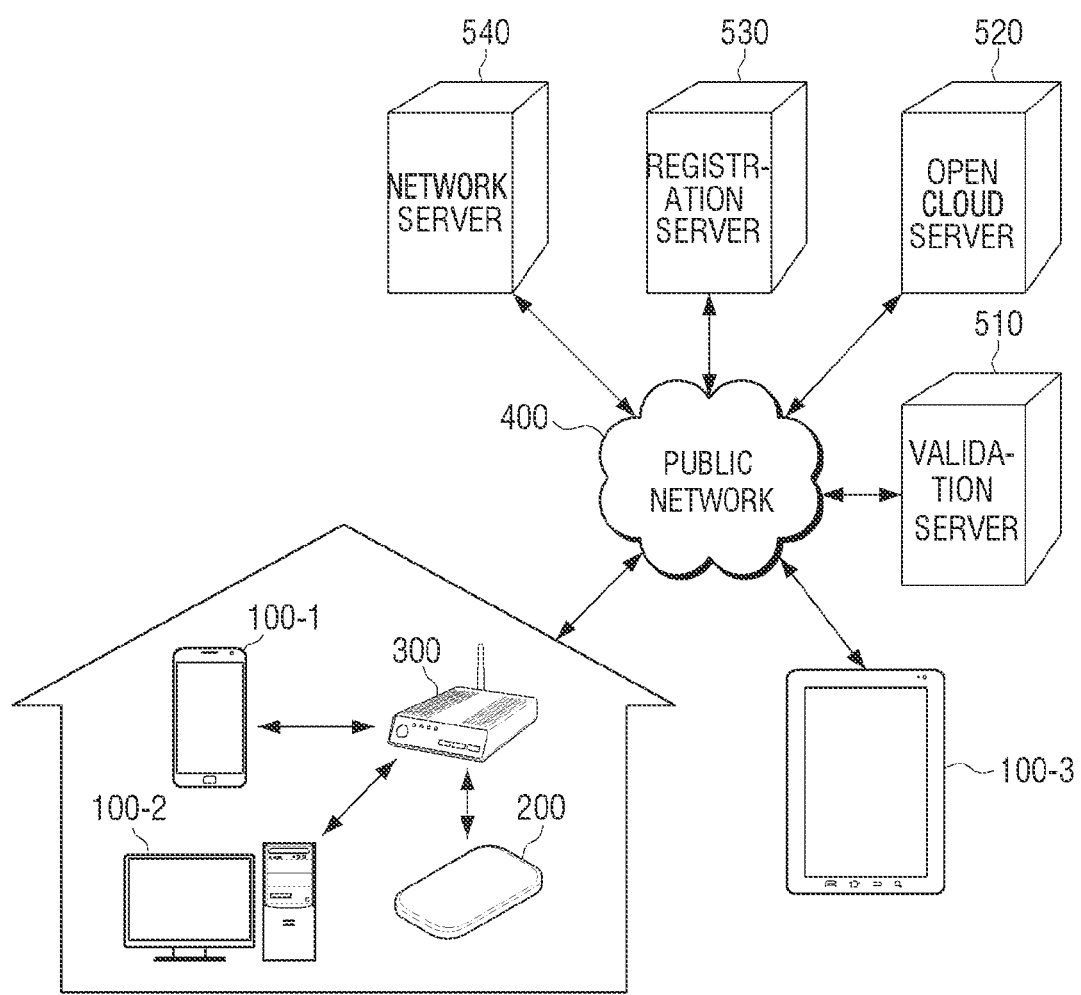
FIG. 1 illustrates a personal cloud system according to an embodiment of the present disclosure.

FIG. 1 illustrates a personal cloud system according to an embodiment of the present disclosure.

Referring to FIG. 1, a personal cloud system may include a plurality of electronic devices 100-1, 100-2, 100-3, a personal cloud apparatus 200, a home Access Point (AP) 300, a public network 400, an authentication (validation) server 510, an open cloud server 520, a registration server 530, and a network server 540.

The plurality of electronic devices 100-1, 100-2, 100-3 may download or upload various contents using the personal cloud apparatus 200. The plurality of electronic devices 100-1, 100-2, 100-3 may particularly perform direct communication with the personal cloud apparatus 200 in the house, or perform communication outside the house with the personal cloud apparatus 200 using the public network 400 and the home AP 300. Accordingly, the plurality of electronic devices 100-1, 100-2, 100-3 may download or upload the contents (e.g., photos, music, video, etc.) using the personal cloud apparatus 200 inside and outside the house.

The personal cloud apparatus refers to hardware where various data of a user may be stored, and it may be configured in the form of various types of hardware for storing personal information.

The plurality of electronic devices 100-1, 100-2, 100-3 may be implemented as any of various electronic devices such as smartphones, tablet PCs, smart TVs, and the like.

The personal cloud apparatus 200 is installed in a home or an office and stores contents for sharing by the plurality of electronic devices 100-1, 100-2, 100-3. The personal cloud apparatus 200 may upload and download the content via direct communication with the electronic device 100, but is not limited thereof. According to another embodiment, the personal cloud apparatus 200 may also communicate with the electronic device 100 via the home AP 300 and the public network 400.

The personal cloud apparatus 200 is particularly registered to the registration server 530 based on user account. Accordingly, a certain user outside the house may be able to log in with the registered user account using the electronic device 100 and share the contents stored in the personal cloud apparatus 200.

The home AP 300 relays connection of the electronic device 100 and the personal cloud apparatus 200 to external public network 400 to enable content sharing even outside the house.

The authentication server 510 verifies a user account in response to the user's login via the electronic device 100, and transmits the user account information to the electronic device 100 to register the personal cloud apparatus 200 to the registration server 530.

The open cloud server 520 backs up the contents stored at the personal cloud apparatus 200 and stores the same.

The registration server 530 registers the plurality of electronic devices 100-1, 100-2, 100-3 and the personal cloud apparatus 200 based on the user account. By way of example, the registration server 530 may register the first electronic device 100-1 and the personal cloud apparatus 200 based on a user account A@samsung.com, and register the second electronic device 100-2 and the personal cloud apparatus 200 based on a user account B@samsung.com. The registration server 530 may be referred to as a 'user portal server' as this can be registered based on the user account.

The registration server 530 may generate a user account list based on the user accounts, which may include at least one of type, peer ID, IP address, and the like of the electronic device 100.

The network server 540 relays the communication between the personal cloud apparatus 200 and the external network based on the peer ID and domain information generated at the registration server 530.

Accordingly, the user is able to register the personal cloud apparatus 200 to the registration server 530 using the electronic device 100 via the personal cloud system, and download or upload the contents using the personal cloud apparatus 200 inside and outside the house.

Meanwhile, the plurality of electronic devices 100-1, 100-2, 100-3 may be implemented as different servers, but the invention is not so limited. In another embodiment, the plurality of electronic devices 100-1, 100-2, 100-3 may be implemented as at least one server rather than four servers.

A method for registering the personal cloud apparatus 200 to the registration server 530 according to an embodiment will be explained below with reference to FIGS. 2 to 14.

Figure 2:
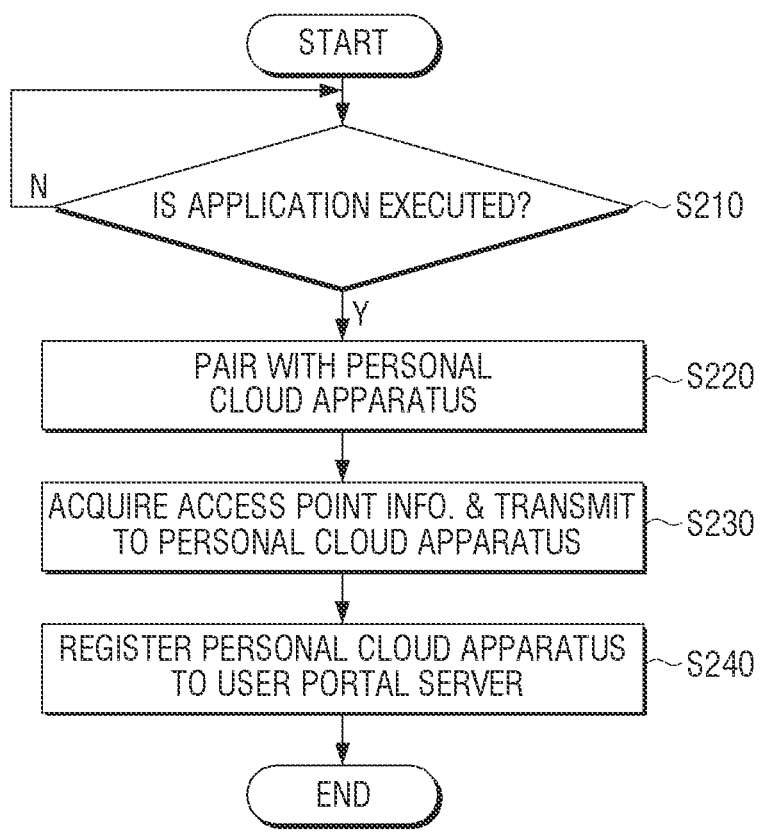
FIG. 2 is a flowchart of a method of an electronic device to register a personal cloud apparatus to a registration server, according to an embodiment of the present disclosure.

FIG. 2 is a flowchart of a method of an electronic device to register a personal cloud apparatus to a registration server, according to an embodiment of the present disclosure.

Referring to FIG. 2, at operation S210, the electronic device 100 determines whether an application is executed. The application may be an application for content sharing by the electronic device 100 using the personal cloud apparatus 200.

At operation S210-Y, when determining that the application is executed, the electronic device 100 performs pairing with the personal cloud apparatus 200 at operation S220. The electronic device 100 may perform pairing with the personal cloud apparatus 200 via various communication interfaces such as, for example, a Bluetooth interface, a WiFi interface, a Zigbee interface, and the like. A method for performing pairing with a personal cloud apparatus using various communication interfaces will be explained below with reference to FIGS. 4 to 6.

At operation S230, the electronic device 100 acquires access point information and transmits the same to the personal cloud apparatus 200. For example, the electronic device 100 may receive information of the home AP 300 currently connected to the electronic device and transmit the information of the home AP 300 to the home AP 300 so that the personal cloud apparatus 200 connects to the home AP 300.

At operation S240, the electronic device 100 registers the personal cloud apparatus 200 to the registration server 530. For example, the electronic device 100 may register the personal cloud apparatus 200 to the registration server 530 based on the user account for content sharing inside or outside the house using the personal cloud apparatus 200. A method of an electronic device 100 registering a personal cloud apparatus to a registration server will be explained below with reference to FIG. 7.

As explained above, the user can share the contents using the personal cloud apparatus 200 inside or outside the house, by registering the personal cloud apparatus 200 to the registration server 530 with use of the electronic device 100.

Figure 3:
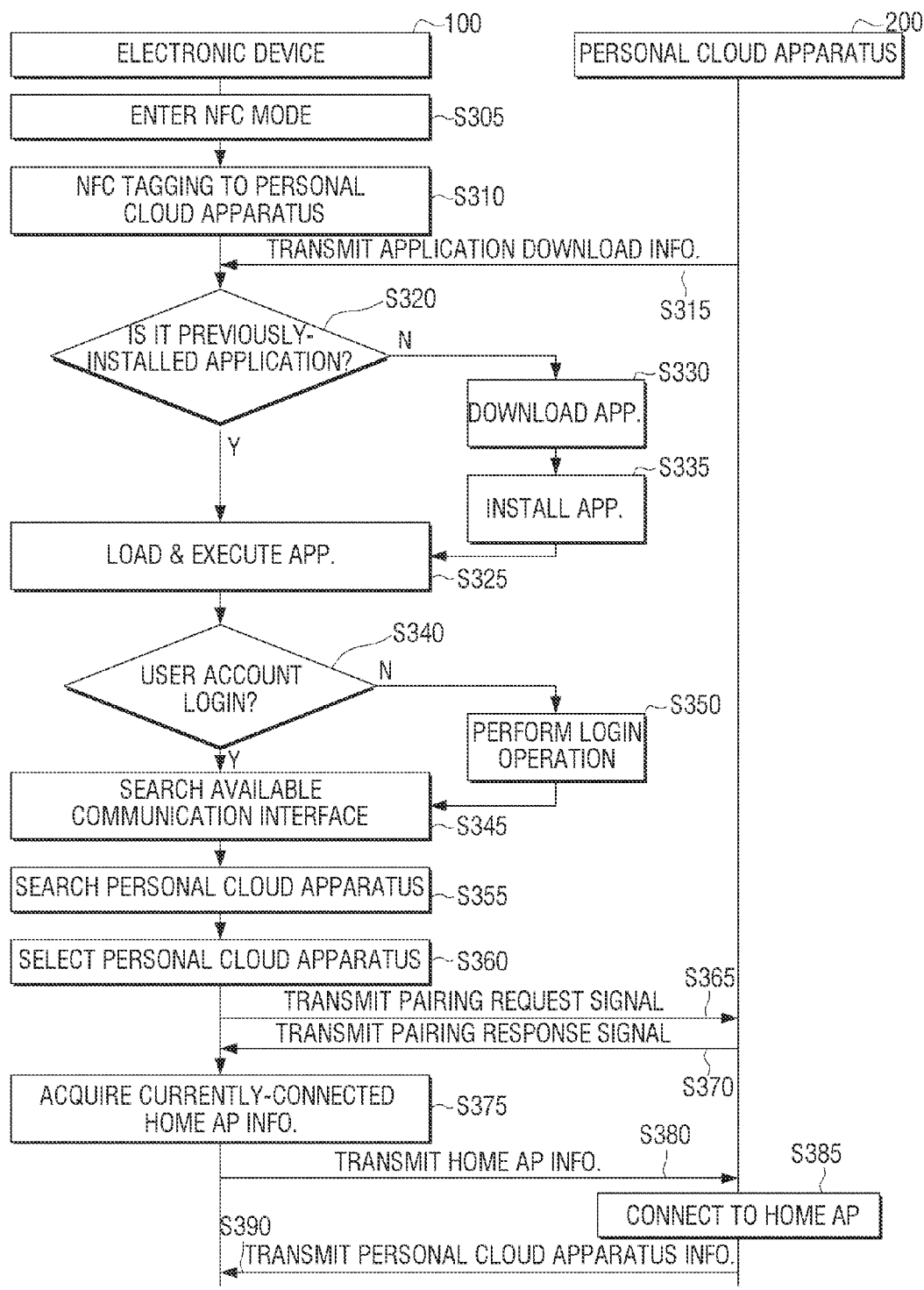
FIG. 3 is a sequence diagram of a method for pairing an electronic device with a personal cloud apparatus, and accessing the personal cloud apparatus to a home Access Point (AP), according to an embodiment of the present disclosure.

FIG. 3 is a sequence diagram of a method for pairing an electronic device and a personal cloud apparatus and accessing the personal cloud apparatus to the home AP according to an embodiment of the present disclosure. FIGS. 15A, 15B, 15C, 15D, and 15E illustrate a User Interface (UI) provided by an electronic device when a personal cloud apparatus is registered to a registration server, according to an embodiment of the present disclosure. FIG. 3 particularly illustrates operation S210 and operation S230 explained above with reference to FIG. 2.

Referring to FIG. 3, at operation S305, the electronic device 100 enters NFC mode. For example, the electronic device 100 enters NFC mode in response to a user's manipulation (e.g., selecting of an icon to enter NFC mode).

At operation S310, the electronic device 100 tags the NFC module to the personal cloud apparatus 200. The electronic device 100 determines whether the NFC module is tagged or not, by determining the presence or absence of the personal cloud apparatus 200 within a threshold distance. When the personal cloud apparatus 200 is within the threshold distance to the electronic device 100, the electronic device 100 may determine that the NFC module is tagged to the personal cloud apparatus 200.

When the electronic device 100 is NFC tagged to the personal cloud apparatus 200, the personal cloud apparatus 200 may transmit the application download information to the electronic device 100 at operation S315. The application download information may include at least one of an application name, a version, a download Uniform Resource Locator (URL), and the like.

At operation S320, the electronic device 100 determines whether the received application download information refers to a previously-installed application.

At operation S320-Y, when determining that the previously-installed application is referred, the electronic device 100 loads the previously-installed application and executes the same at operation S325. The electronic device 100 may display an application loading screen, such as the one illustrated in FIG. 15A, on a display screen.

At operation S320-N, when determining that the previously-installed application is not referred, the electronic device 100 downloads an application based on the application download information at operation S330. For example, the electronic device 100 may access an application store based on the URL of the application store from which the application can be downloaded, and download the latest-version of the file of the corresponding application.

At operation S335, the electronic device 100 installs the downloaded application, and at operation S325, loads the installed application and executes the same. The electronic device 100 may display an application loading screen, such as the one illustrated in FIG. 15A, on a display screen.

At operation S340, the electronic device 100 determines whether the login was done with the user account. At operation S340-N, when the login was not done with a specific user account, the electronic device 100 performs a login operation according to user input at operation S350. That is, when the login was not done with a specific user account, the electronic device 100 may display a login page, and log in with a specific user account through the login page. The electronic device 100 may perform a login operation to thus transmit information about the user account (e.g., user account ID and password) to the authentication server 510.

At operation S345, the electronic device 100 searches available communication interfaces. The available communication interface may include at least one of the Bluetooth interface, the WiFi interface the Zigbee interface, and the like.

At operation S355, the electronic device 100 searches for personal cloud apparatus 200 using the available communication interface. The electronic device 100 may search for the personal cloud apparatus 200 in different manners, depending on the types of the available communication interfaces. For example, when the available communication interface is Bluetooth interface, the electronic device 100 may search for the personal cloud apparatus 200 through a discovery operation. On the other hand, while when the available communication interface is the WiFi interface, the electronic device 100 may receive Service Set IDentifier (SSID) information broadcast from the personal cloud apparatus 200 and search the personal cloud apparatus 200.

At operation S360, the electronic device 100 selects the searched personal cloud apparatus 200. When the electronic device 100 selects a plurality of personal cloud apparatuses 200, the electronic device 100 may select one from among these personal cloud apparatuses 200 in accordance with a user input. For example, the electronic device 100 may display a User Interface (UI) on a display screen through which the searched personal cloud apparatuses 200 can be selected. For example, referring to FIG. 15B, the electronic device 100 may display a UI including the plurality of searched personal cloud apparatuses 200. In response to a user command to select one from among the plurality of personal cloud apparatuses 200 included in the UI, the electronic device 100 may select a personal cloud apparatus 200 to which the user command refers.

At operation S365, the electronic device 100 transmits a pairing request signal to the selected personal cloud apparatus 200. The electronic device 100 may display an instruction 15 to select a button provided on the personal cloud apparatus 200 as the one illustrated in FIG. 15C, to increase security on the connection between the electronic device 100 and the personal cloud apparatus 200.

At operation S370, the personal cloud apparatus 200 transmits a pairing response signal in response to the pairing request signal. The personal cloud apparatus 200 may transmit a pairing response signal upon selecting of a button.

At operation S375, the electronic device 100 acquires information about the home AP 300 which is currently connected. For example, the electronic device 100 may receive access point information (e.g., SSID and password of the home AP 300) from the home AP 300.

At operation S380, the electronic device 100 transmits the information about the home AP 300 to the personal cloud apparatus 200. The electronic device 100 may automatically transmit the home AP 300 information to the personal cloud apparatus 200, but the invention is not so limited. According to another embodiment, the electronic device 100 may transmit the information about the home AP 300 to the personal cloud apparatus 200 in response to a user command. For example, referring to the UI illustrated in FIG. 15D, when a password is inputted and then a "Send" button is selected, the electronic device 100 may transmit the information about the home AP 300 to the personal cloud apparatus 200.

At operation S385, the personal cloud apparatus 200 establishes communication to the home AP 300 using the access point information of the home AP as received.

At operation S390, the personal cloud apparatus 200 transmits the information on the personal cloud apparatus 200 to the electronic device 100. The information on the personal cloud apparatus 200 may be MAC address information of the personal cloud apparatus 200.

Figure 15A:
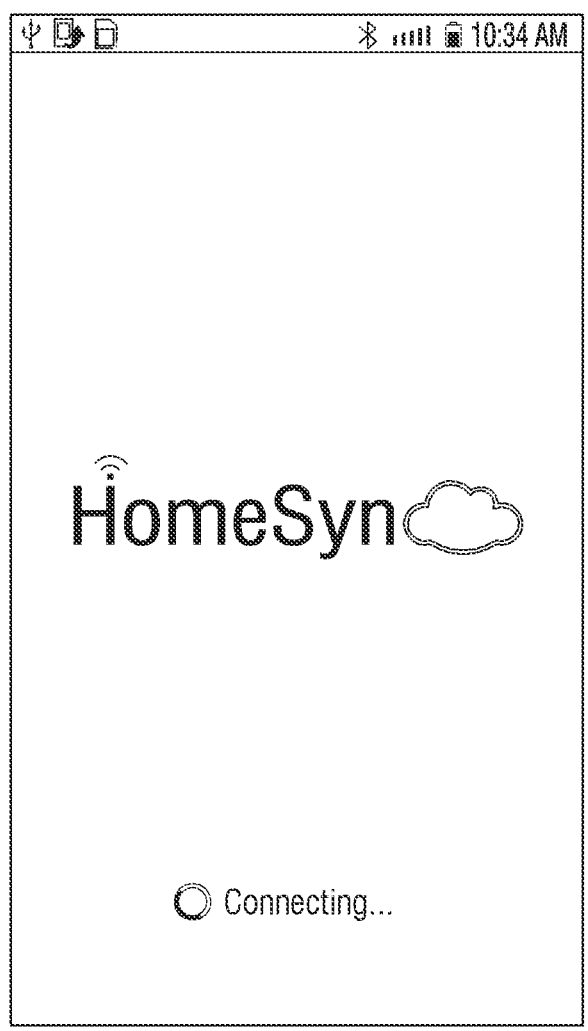
FIGS. 15A, 15B, 15C, 15D, and 15E illustrate a User Interface (UI) provided by an electronic device when a personal cloud apparatus is registered to a registration server, according to an embodiment of the present disclosure.
Figure 15B:
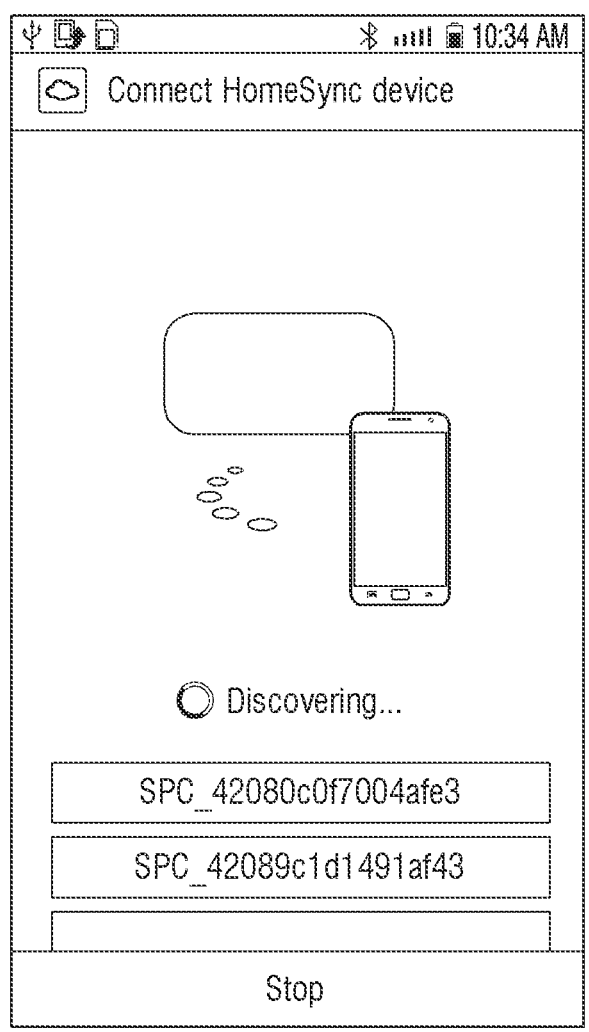
Figure 15C:
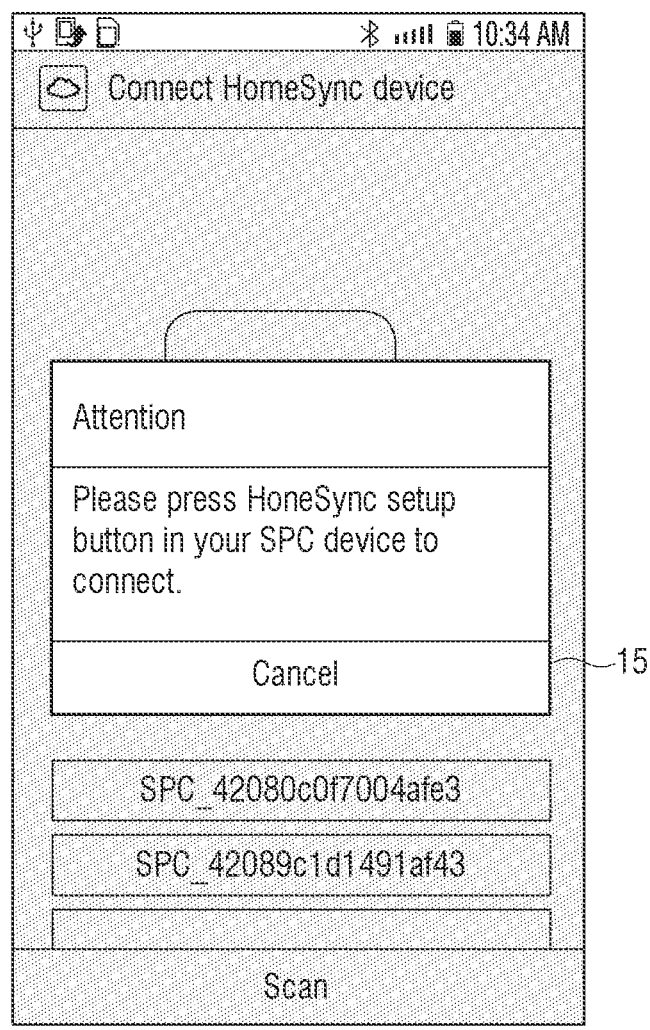
Figure 15D:
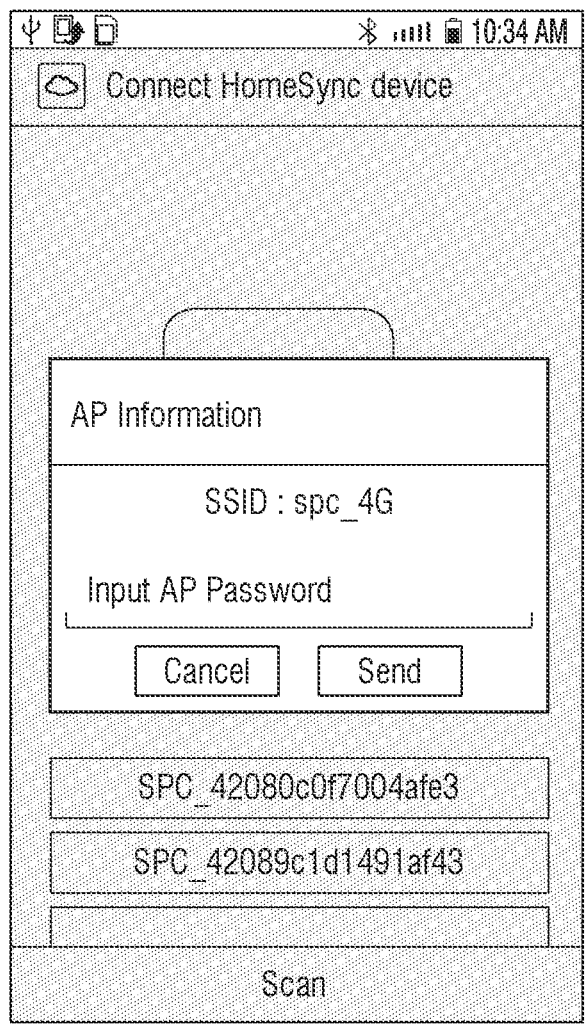
Figure 15E:
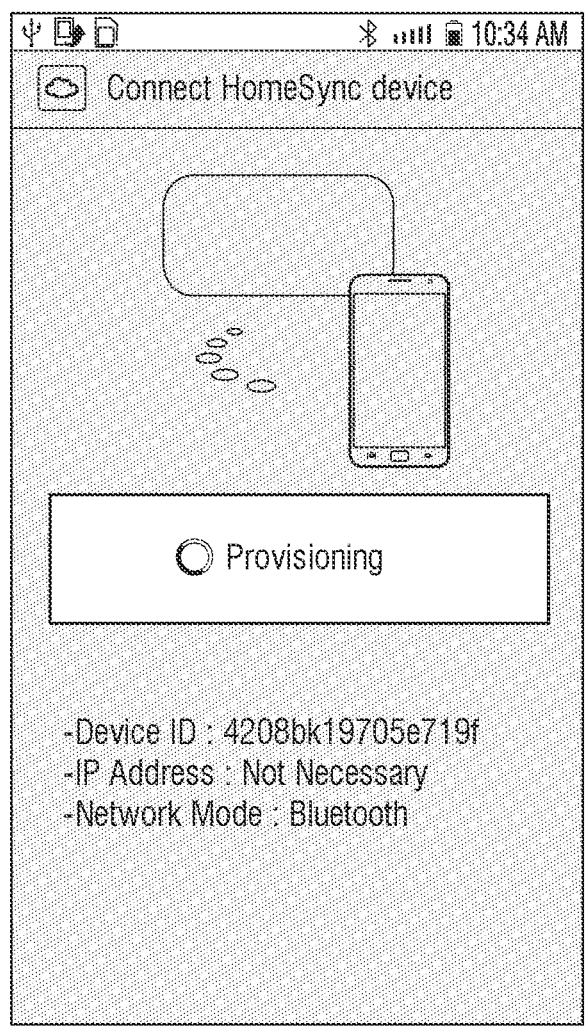

After that, the electronic device 100 may provide the UI, such as the one illustrated in FIG. 15E, while registering the personal cloud apparatus 200 to the registration server 530.

Accordingly, the electronic device 100 may perform pairing with the personal cloud apparatus 200 in the manner explained above. Further, the personal cloud apparatus 200 may access the home AP 300 to connect to an external network.

A method of an electronic device for pairing with a personal cloud apparatus and of a personal cloud apparatus for accessing the home AP depending on the types of communication interfaces will be explained below with reference to FIGS. 4 to 6.

Figure 4:
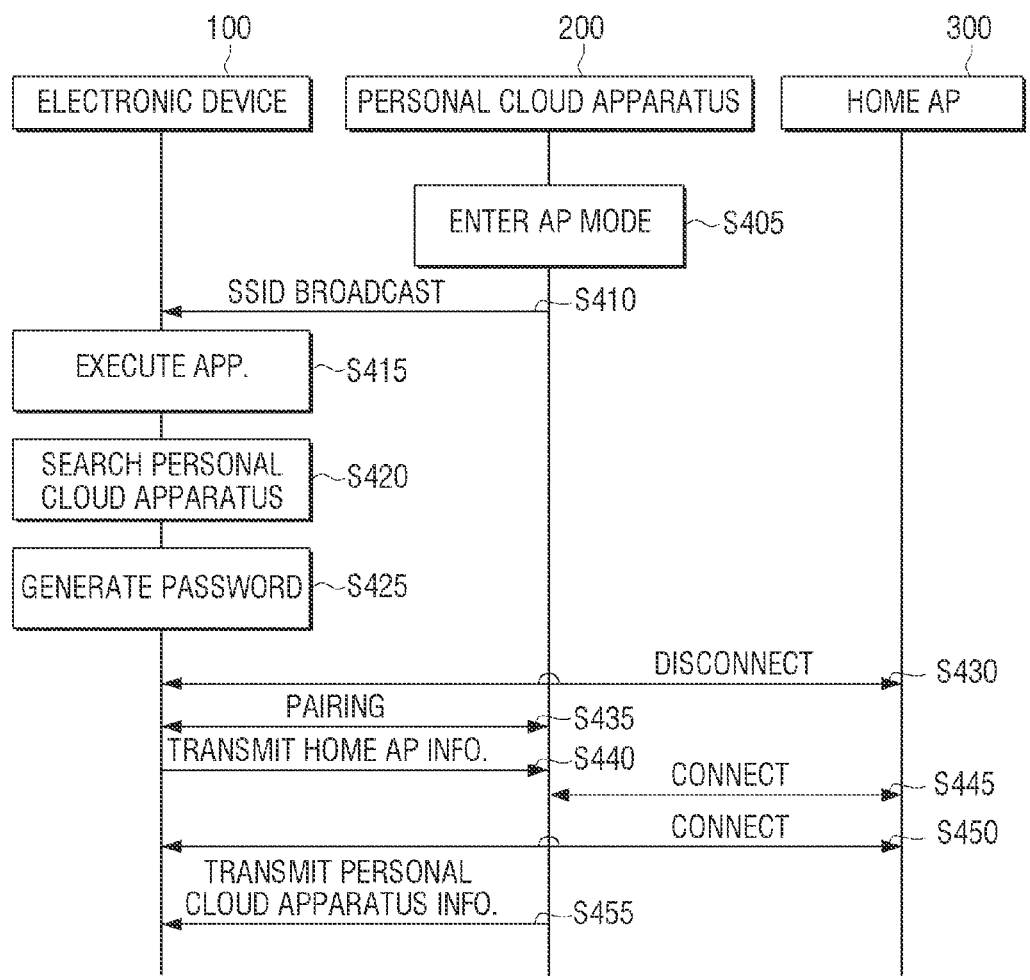
FIG. 4 is a sequence diagram of a method of an electronic device to pair with a personal cloud apparatus using a WiFi interface, according to an embodiment of the present disclosure.

FIG. 4 is a sequence diagram of a method of an electronic device for pairing with a personal cloud apparatus using a WiFi interface, according to an embodiment of the present disclosure. In FIG. 4, it is assumed that the electronic device is in a connected state with the home AP 300.

Referring to FIG. 4, at operation S405, the personal cloud apparatus 200 enters an AP mode in response to a user input. For example, the personal cloud apparatus 200 may enter the AP mode in response to a selection made on a button provided on the personal cloud apparatus 200.

At operation S410, the personal cloud apparatus 200 broadcasts an SSID so that electronic device 100 performs a search through the WiFi interface. The broadcast SSID may be unique number of the personal cloud apparatus 20. For example, the broadcast SSID may be "SPC-80C78LS4P" by combining "SPC," which stands for the personal cloud apparatus 200 and "80C78LS4P," which stands for the serial number of the personal cloud apparatus 200.

At operation S415, the electronic device 100 executes an application in response to a user input. Referring to FIG. 3, the electronic device 100 may download an application in an NFC tagging operation and execute the downloaded application.

At operation S420, the electronic device 100 searches for the personal cloud apparatus 200. For example, the electronic device 100 may search for the personal cloud apparatus 200 by checking the SSID broadcast from the personal cloud apparatus 200.

At operation S425, the electronic device 100 generates a password using the received SSID and the MAC address of the personal cloud apparatus 200. For example, the electronic device 100 may obtain a hash value by applying a hash algorithm, such as SHA-1, with the received SSID and MAC address of the personal cloud apparatus 200, and uses the obtained hash value as a password. Accordingly, the data transmitted between the personal cloud apparatus 200 and the electronic device 100 can be safeguarded, and the electronic device 100 can automatically generate the password to access the personal cloud apparatus 200 without requiring a pre-stored password.

Since the personal cloud apparatus 200 operates in AP mode, at operation S430, the electronic device 100 disconnects the home AP 300 to connect to the personal cloud apparatus 200.

At operation S435, the electronic device 100 performs pairing with the personal cloud apparatus 200.

At operation S440, the electronic device 100 transmits the information about the home AP 300 connected so far, to the personal cloud apparatus 200.

At operation S445, the personal cloud apparatus 200 performs connection with the home AP 300 based on the received information about the home AP 300. At operation S450, the electronic device 100 again performs connection to the home AP 300.

To register the personal cloud apparatus 200 to the registration server 530, at operation S455, the personal cloud apparatus 200 sends the information about the personal cloud apparatus 200 (e.g., MAC address, device ID, etc.) to the electronic device 100.

When the information about the home AP 300 is transmitted to the personal cloud apparatus 200 via the WiFi interface, in the case of an application, it is possible to store unique data information such as a secret code of the application that is stored at the time of developing. The electronic device 100 may be so designed as to acquire the information about the home AP 300 using the application secret code information as a key value, via a specific software interface (e.g., a Get_WiFi_Info function) on the Supplicant Config. Accordingly, a security problem, such as exposure of a password in the acquisition process of the information about home AP 300, is prevented.

Figure 5:
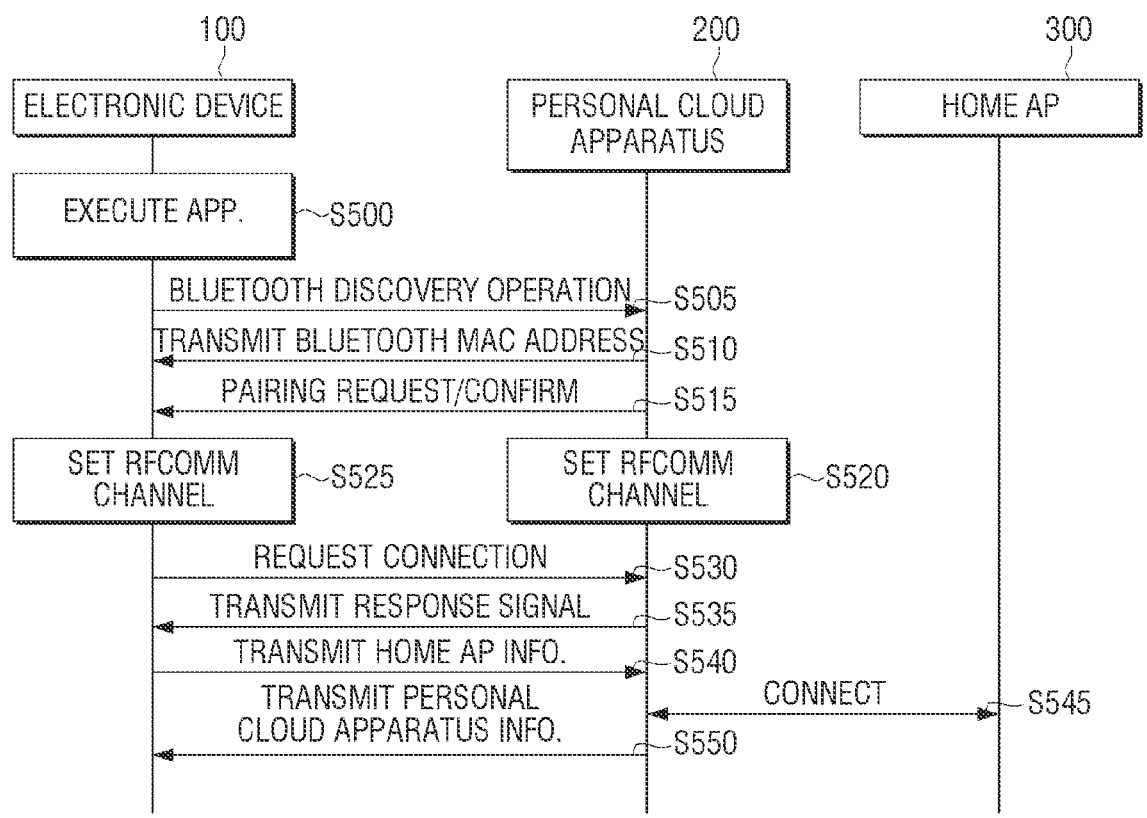
FIG. 5 is a sequence diagram of a method of an electronic device to pair with a personal cloud apparatus using a Bluetooth interface, according to an embodiment of the present disclosure.

FIG. 5 is a sequence diagram of a method of an electronic device for pairing with a personal cloud apparatus using a Bluetooth interface, according to an embodiment of the present disclosure.

Referring to FIG. 5, at operation S500, the electronic device 100 executes an application. As explained above with reference to FIG. 3, the electronic device 100 may download an application with an NFC tagging operation and execute the downloaded application.

At operation S505, the electronic device 100 performs a Bluetooth discovery operation. That is, the electronic device 100 may search for the personal cloud apparatuses 200 in the neighborhood by transmitting a Bluetooth discovery request signal.

When the discovery request signal is transmitted, at operation S510, the personal cloud apparatus 200 transmits a Bluetooth MAC address to the electronic device 100 in response to the discovery request signal.

At operation S515, the electronic device 100 requests the personal cloud apparatus 200 for pairing and the personal cloud apparatus 200 confirms the request for pairing.

At operation S520, the personal cloud apparatus 200 sets RFCOMM channel on the Bluetooth interface standard to perform communication with the electronic device 100. The personal cloud apparatus 200 stands by for a request for connection from the electronic device 100.

At operation S525, the electronic device 100 sets the same RFCOMM channel as the RFCOMM channel set by the personal cloud apparatus 200, and at operation S530, requests the personal cloud apparatus 200 for connection.

At operation S535, the personal cloud apparatus 200 transmits a response signal in response to the request for connection. Accordingly, the pairing between the electronic device 100 and the personal cloud apparatus 200 is completed.

At operation S540, the electronic device 100 transmits the information about the currently-connected home AP 300 to the personal cloud apparatus 200. The electronic device 100 may encrypt the information about the home AP 300 before sending the same. That is, to ensure security of the home AP information (e.g., SSID and password of the home AP), the electronic device 100 may encrypt the information of the home AP by applying an encryption algorithm (e.g., AES-128) before transmitting the same. The symmetric key used in the encryption and decryption between the electronic device 100 and the personal cloud apparatus 200 may use unique information (e.g., application ID-hash) of the application.

At operation S545, when the home AP 300 information is transmitted, the personal cloud apparatus 200 performs a connecting operation to the home AP 300. The personal cloud apparatus 200 may particularly decrypt the encrypted information of the home AP 300 and perform a connecting operation to the home AP 300 based on the decrypted home AP 300 information.

At operation S550, the personal cloud apparatus 200 may transmit the information of the personal cloud apparatus 200 to the electronic device 100 to register the personal cloud apparatus 200 to the registration server 530.

Figure 6:
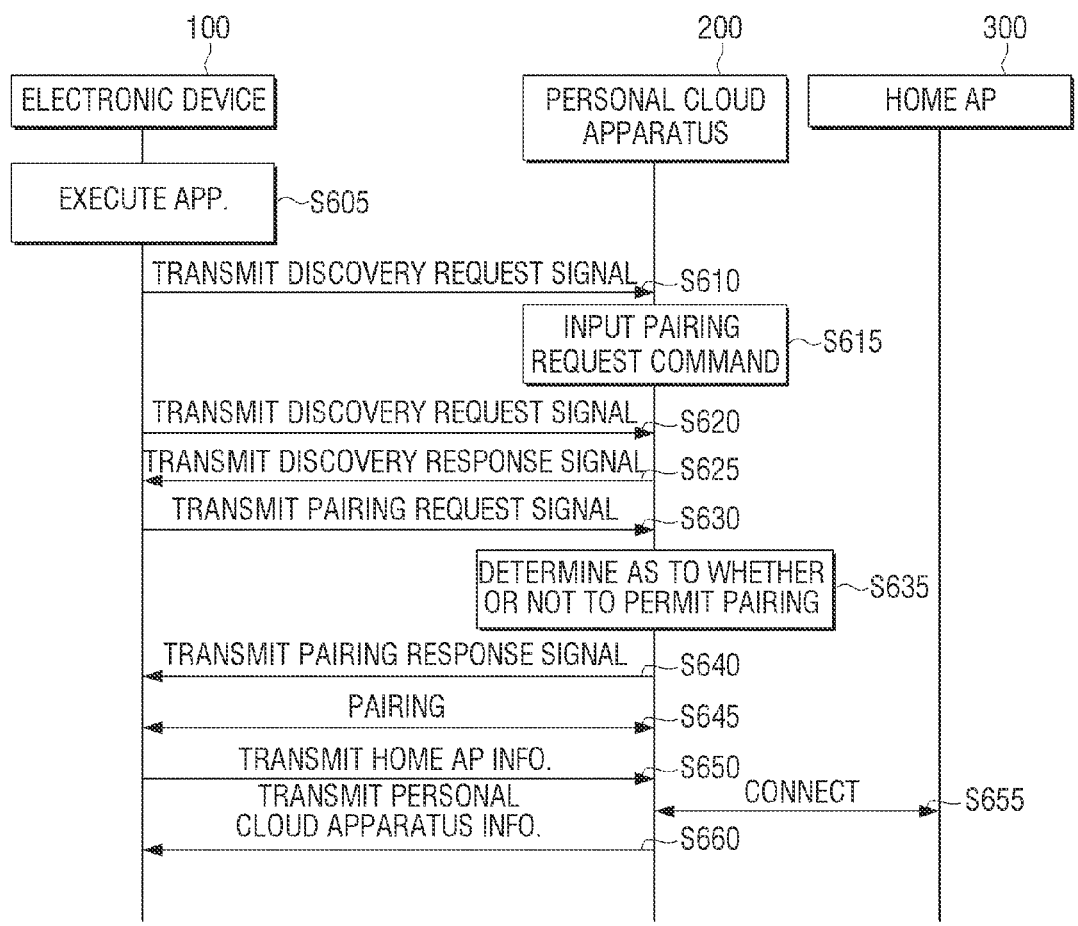
FIG. 6 is a sequence diagram of a method of an electronic device to pair with a personal cloud apparatus using a Zigbee interface, according to an embodiment of the present disclosure.

FIG. 6 is a sequence diagram of a method of an electronic device for pairing with a personal cloud apparatus using a Zigbee interface, according to an embodiment of the present disclosure.

Referring to FIG. 6, at operation S605, the electronic device 100 executes an application. As explained above with reference to FIG. 3, the electronic device 100 may download an application with an NFC tagging operation and execute the downloaded application.

At operation S610, the electronic device 100 may transmit a discovery request signal. The electronic device 100 may periodically transmit a discovery request signal.

At operation S615, the personal cloud apparatus 200 receives a pairing request command. The pairing request command may be a selecting of a button provided on the personal cloud apparatus 200.

At operation S620, when the electronic device 100 transmits a discovery request signal, the personal cloud apparatus 200 transmits a discovery response signal at operation S625 in response to the discovery request signal.

When the response signal is received, the electronic device 100 transmits a pairing request signal at operation S630. When the pairing request signal is transmitted, at operation S635, the personal cloud apparatus 200 determines whether to allow pairing, and at operation S640, transmits a pairing response signal in response to the pairing request signal.

At operation S645, when the pairing response signal is received, the electronic device 100 pairs with the personal cloud apparatus 200.

At operation S650, when the electronic device 100 and the personal cloud apparatus 200 are paired with each other, the electronic device 100 transmits the information of the home AP 300.

At operation S655, the personal cloud apparatus 200 performs a connecting operation to the home AP 300 based on the received information about the home AP 300.

At operation S660, the personal cloud apparatus 200 transmits information about personal cloud apparatus 200 to register the personal cloud apparatus 200 to the registration server 530.

As explained above with reference to FIGS. 4 to 6, the electronic device 100 may perform pairing with the personal cloud apparatus 200 via various communication interfaces, and the personal cloud apparatus 200 may connect to the home AP 300 using the information of the home AP 300 as transmitted from the electronic device 100.

Figure 7:
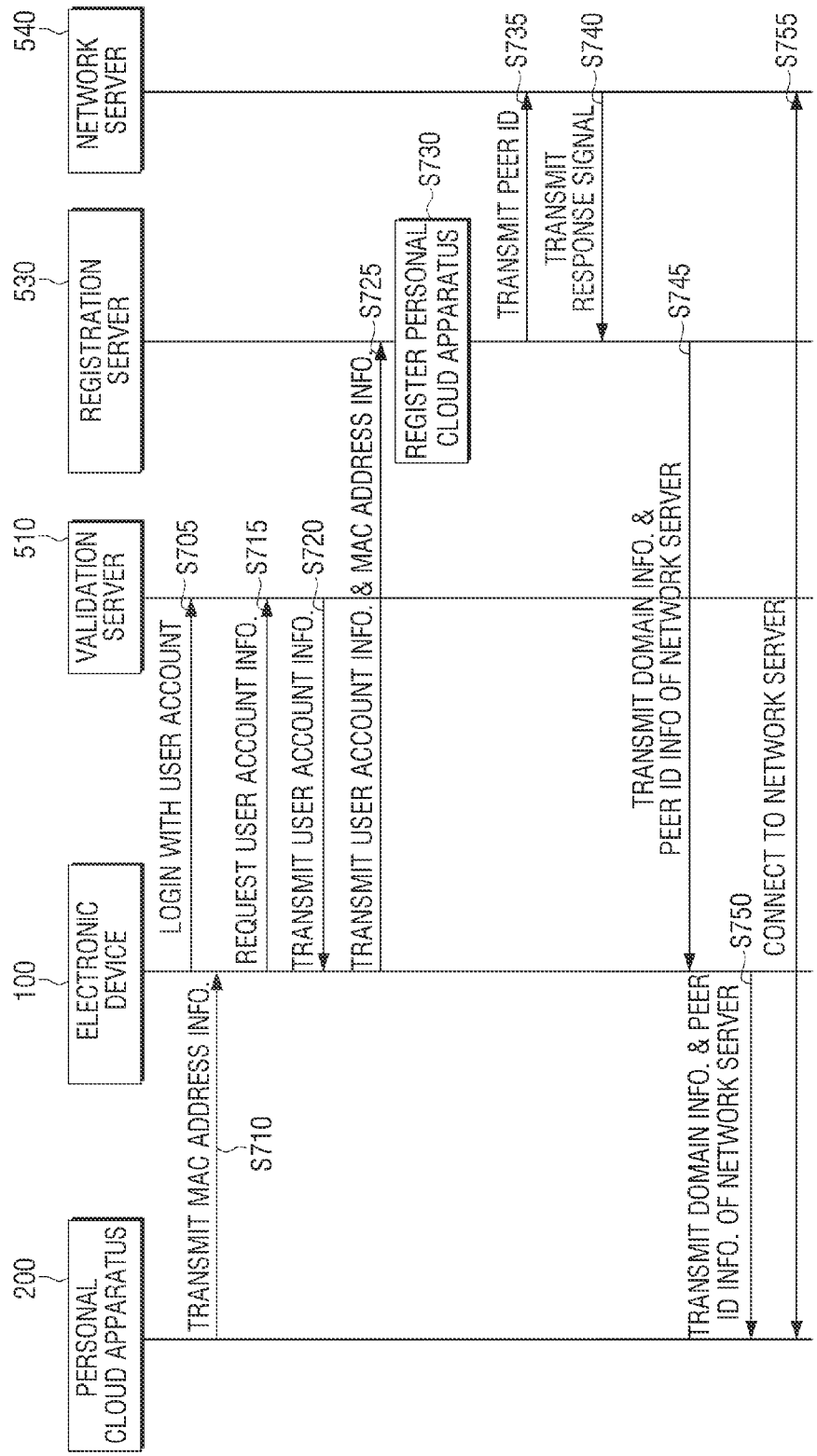
FIG. 7 is a sequence diagram of a method for registering a personal cloud apparatus to a registration server on a personal cloud system, according to an embodiment of the present disclosure.

FIG. 7 is a sequence diagram of a method for registering a personal cloud apparatus to a registration server, in a personal cloud system, according to an embodiment of the present disclosure. FIG. 7 particularly illustrates operation S240 of FIG. 2.

Referring to FIG. 7, the electronic device 100 logs in to an authentication server 510 with a specific user account at operation S705. The user account may be email information (e.g., A@samsung.com) used by a user.

At operation S710, the personal cloud apparatus 200 transmits MAC address information of the personal cloud apparatus 200 to the electronic device 100.

Operation at S705 corresponds to operation S340 and operation S350 of FIG. 3, and operation S710 may correspond to operation S390 of FIG. 3.

At operation S715, the personal cloud apparatus 200 requests the authentication server 510 for user account information. The personal cloud apparatus 200 may transmit a user account ID and a password to request the user account information.

At operation S720, the authentication server 510 transmits the user account information in response to the request for the user account information. The user account information may include not only the user account ID and the password, but also token information, and token secret information.

The electronic device 100 transmits the received user account information and the MAC address information of the personal cloud apparatus 200 to the registration server 530 at operation S725. The electronic device 100 may additionally transmit information about the personal cloud apparatus 200 (e.g., device type, device model name, etc.) and information about a service type, along with the user account information and the MAC address information of the personal cloud apparatus 200.

The registration server 530 registers the personal cloud apparatus 200 at operation S730. The registration server 530 determines whether the personal cloud apparatus 200 is registered on the registration server 530 based on the MAC address information, the unique information of the personal cloud apparatus 200. When the personal cloud apparatus 200 is not registered, the registration server 530 registers the personal cloud apparatus 200 under the log-in user account.

At operation S735, the registration server 530 generates peer ID so that the personal cloud apparatus 200 can connect to the network server 540 and transmits the same to the network server 540. The peer ID may be generated using the MAC address information, which is the unique information of the personal cloud apparatus 200. That is, the peer ID may correspond to the MAC address information of the personal cloud apparatus 200.

At operation S740, the network server 540 transmits a response signal in response to the peer ID information as transmitted.

At operation S745, the registration server 530 transmits the domain information and peer ID information of the network server 540 to the electronic device 100. The domain information of the network server 540 is the domain information to which the personal cloud apparatus 200 can connect.

At 750, the electronic device 100 transmits the domain information of the network server 540 and the peer ID information as received to the personal cloud apparatus 200, and at operation S755, the personal cloud apparatus 200 performs a connecting operation to the network server 540 based on the domain information of the network server 540 and the peer ID information as received.

As a result of the operation explained above with reference to FIG. 7, the user is able to register the personal cloud apparatus 200 to the registration server 530 using the electronic device 100. Further, since the personal cloud apparatus 200 is connected to the network server 540, the user is also able to share the content not only inside the house, but also outside the house.

The user can particularly register the personal cloud apparatus 200 to the registration server 530 in response to a simple selecting of the personal cloud apparatus 200 and a pressing motion on a button of the personal cloud apparatus 200, when a plurality of personal cloud apparatuses 200 are searched in response to an input to execute an application. That is, user convenience is greatly increased, since the user is able to register the personal cloud apparatus 200 to the registration server 530 by simply selecting an icon or a button, without having to go through an initial network setup operation.

In one embodiment, the registration server 530 may register the personal cloud apparatus 200 and the electronic device 100 based on the user account. That is, by registering the personal cloud apparatus 200 using a plurality of user accounts, a plurality of users can share the same personal cloud apparatus 200.

As explained above with reference to FIGS. 2 to 7, when one user registers the personal cloud apparatus 200 with a specific user account, an additional user may register the personal cloud apparatus 200 with another user account in the manners explained above with reference to FIGS. 2 to 7.

However, the registration server 530 may generate a user account list and register the personal cloud apparatus 200 and the electronic device 100 based on the user accounts, when registering the personal cloud apparatus 200. That is, the registration server 530 may divide and manage the personal cloud apparatuses 200 and electronic devices based on the user accounts. The method of the registration server 530 for registering personal cloud apparatus 200 according to user accounts will be explained below with reference to FIG. 8.

Figure 8:
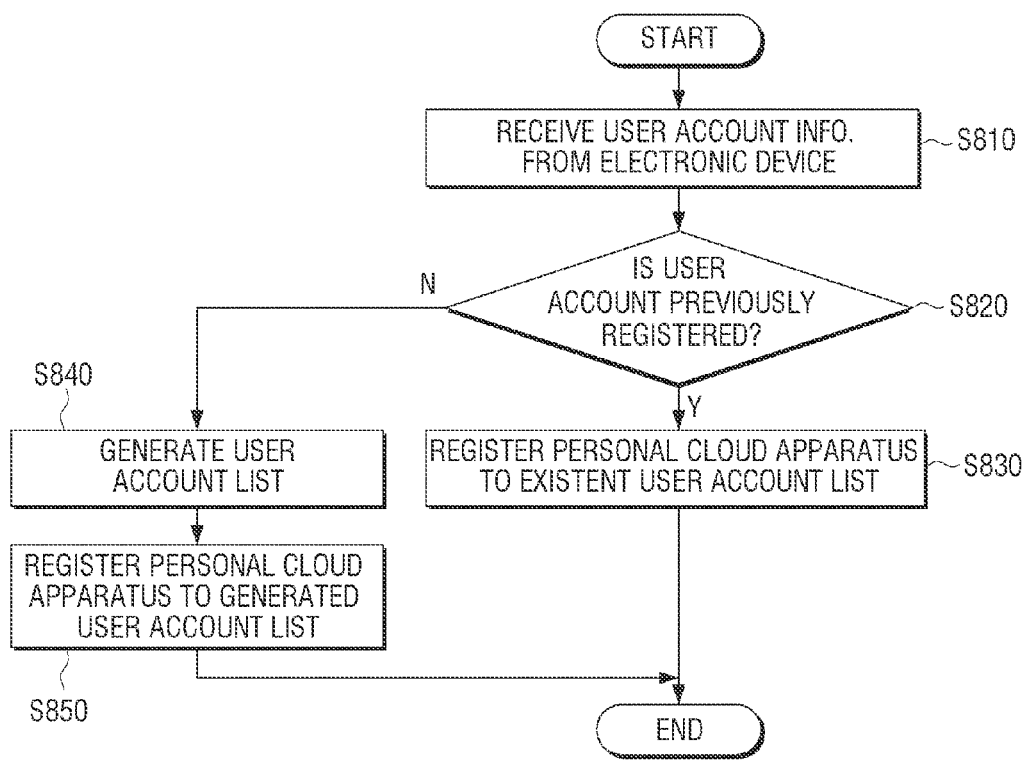
FIG. 8 is a flowchart of a method of a registration server for registering a personal cloud apparatus according to user account, according to an embodiment of the present disclosure.

FIG. 8 is a flowchart of a method of a registration server for registering a personal cloud apparatus according to user account, according to an embodiment of the present disclosure.

Referring to FIG. 8, the registration server 530 receives user account information from the electronic device 100 at operation S810. Operation S810 of FIG. 8 may correspond to operation S725 of FIG. 7.

At operation S820, the registration server 530 determines whether the user account is previously registered. That is, the registration server 530 may determine whether the user account logging in the authentication server 510 is previously registered.

At operation S820-Y, when the user account is previously registered, the registration server 530 registers the personal cloud apparatus 200 on an existing user account information list at operation S830.

However, at operation S820-N, when the user account is not previously registered, at operation S840, the registration server 530 generates a user account list, and at operation S850, registers the personal cloud apparatus 200 on the generated user account list.

FIG. 9 illustrates a registration message format according to user accounts, when the same personal cloud apparatus is registered with different user accounts, according to an embodiment of the present disclosure.

Referring to FIG. 9, the user account "A" may have user ID "acklqczh5b", while the user account "B" may have user ID "gulnoevz0p". As illustrated in FIG. 9, since the same personal cloud apparatus 200 is registered, the personal cloud apparatus 200 has the same MAC address information (e.g., MAC:00000000001), although the user accounts are different.

Figure 10:
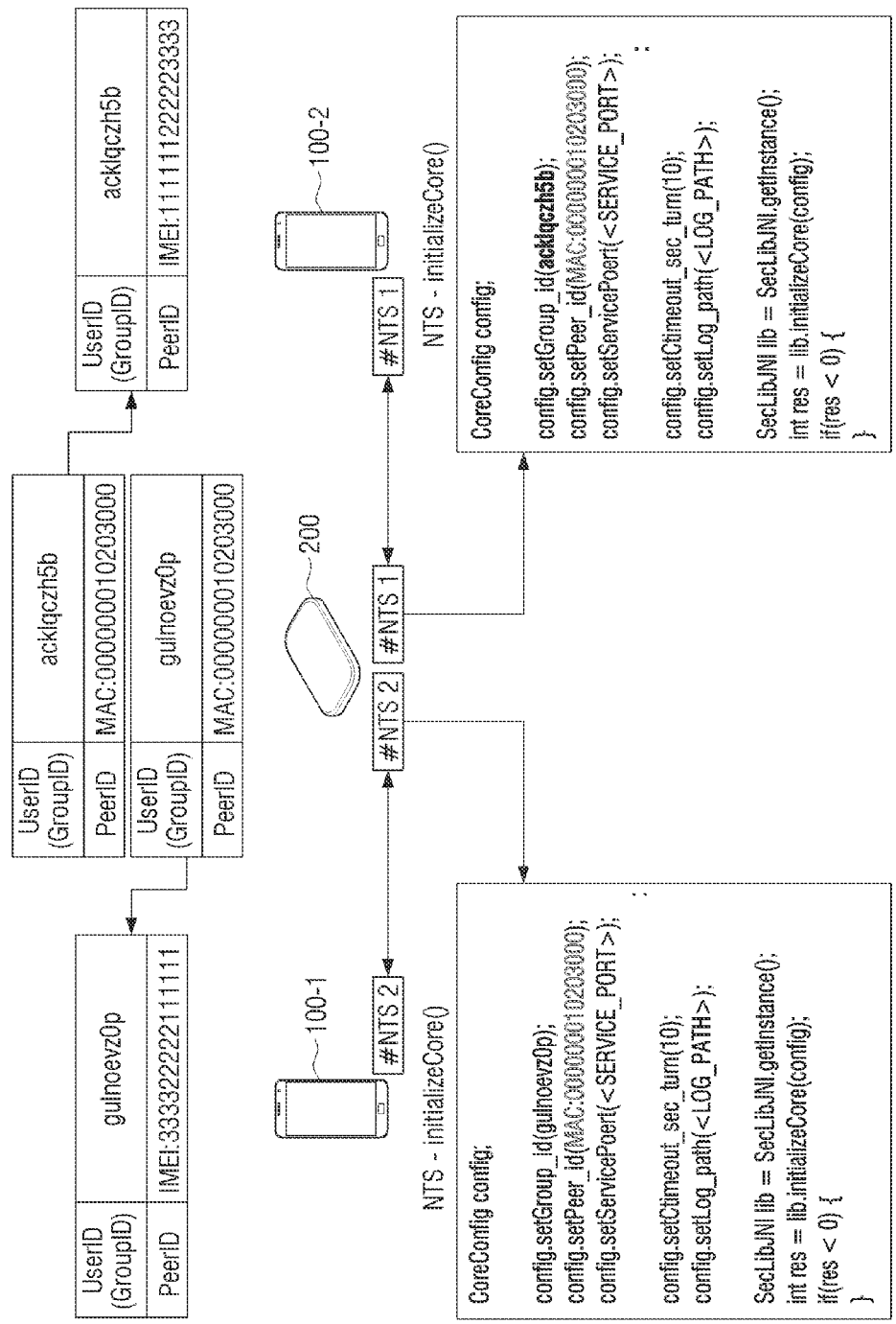
FIG. 10 illustrates a method for setting a user account and a peer ID between a personal cloud apparatus and an electronic device, according to an embodiment of the present disclosure.

FIG. 10 illustrates a method for setting a user account and a peer ID between a personal cloud apparatus and an electronic device, according to an embodiment of the present disclosure.

Referring to FIG. 10, the personal cloud apparatus 200 may keep two network server connection modules to keep both a user account using a first electronic device 100-1 and a user account using a second electronic device 100-2 at the same time.

The peer ID for the personal cloud apparatus 200 to connect to the network server 540 may be generated based on the MAC address information of the personal cloud apparatus 200, irrespective of the user account.

For example, referring to FIG. 10, the first electronic device 100-1 of the user account B as registered on the registration server 530 may have user ID' gulnoevz0p and peer ID IMEI:333322222111111, and the personal cloud apparatus 200 of the user account B may have user ID gulnoevz0p and peer ID MAC:000000010203000. Further, the second electronic device 100-2 of the user account A as registered on the registration server 530 may have user ID' acklqczh5b and peer ID IMEI:111111222223333, and the personal cloud apparatus 200 of the user account A may have user ID acklqczh5b and peer ID MAC:000000010203000.

That is, as illustrated in FIG. 10, with the same personal cloud apparatus 200, even with different registered user accounts (or user IDs) are given the same peer ID. As a result, a plurality of users can use the same personal cloud apparatus 200 using different accounts.

Figure 11:
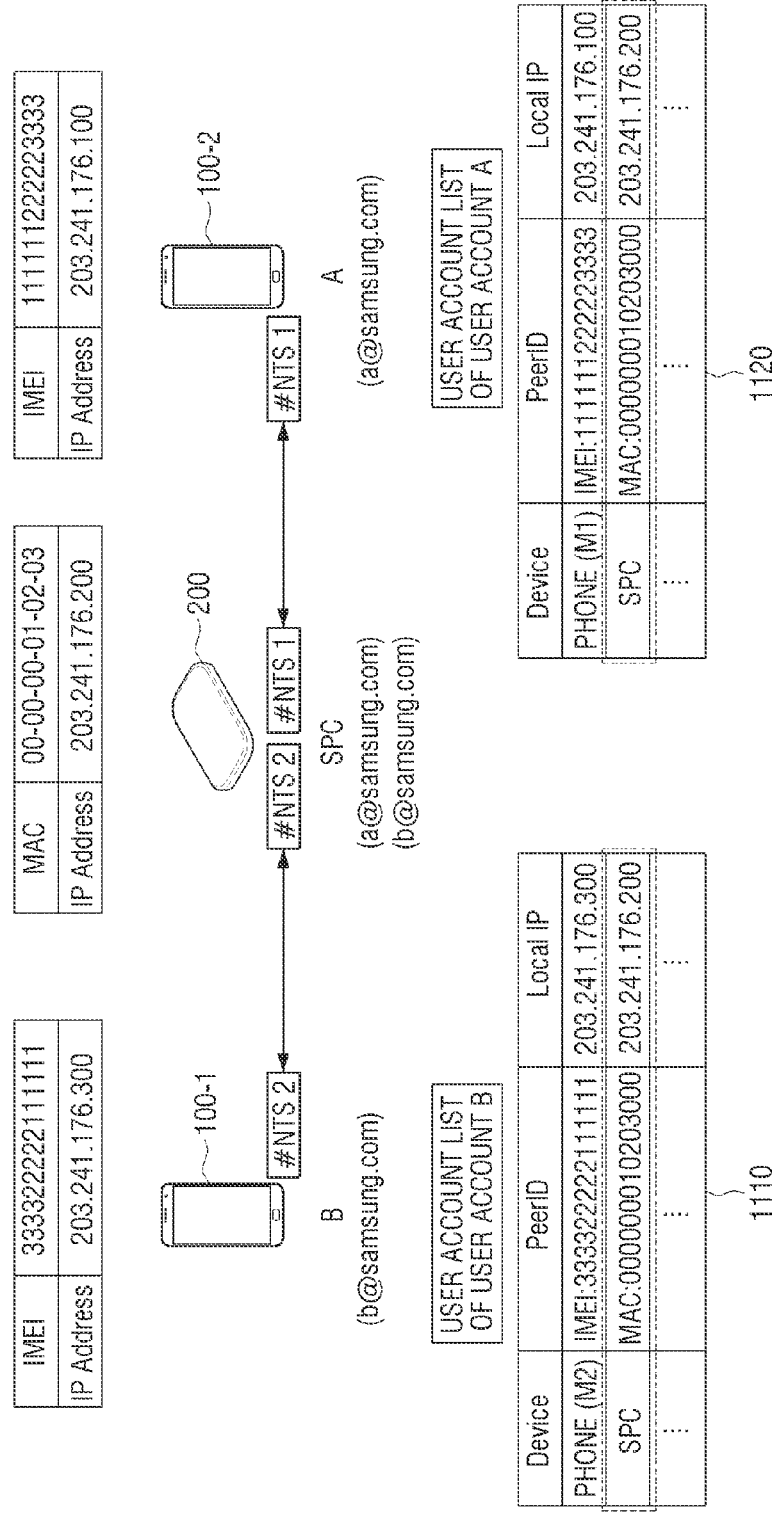
FIG. 11 illustrates a user account list stored in a registration server according to user account, according to an embodiment of the present disclosure.

FIG. 11 illustrates a user account list stored in a registration server according to user account, according to an embodiment of the present disclosure.

Referring to FIG. 11, the personal cloud apparatus 200 registered under different user accounts stores the same peer ID information (MAC:000000010203000) and local IP information (203.241.176.200) in the user account lists 1110, 1120 of the user account A and user account B.

Accordingly, the plurality of electronic devices 100-1, 100-2 may connect to the personal cloud apparatus 200 using the peer information of the personal cloud apparatus 200 as stored in the registration server 530.

As explained above with reference to FIGS. 8 to 11, as the electronic device 100 and the personal cloud apparatus 200 are grouped based on the user accounts, and the peer ID is generated based on the MAC address information of the personal cloud apparatus 200, a plurality of users can share the same personal cloud apparatus 200.

The constitutions of an electronic device and a personal cloud apparatus will now be explained below with reference to FIGS. 12 and 13.

Figure 12:
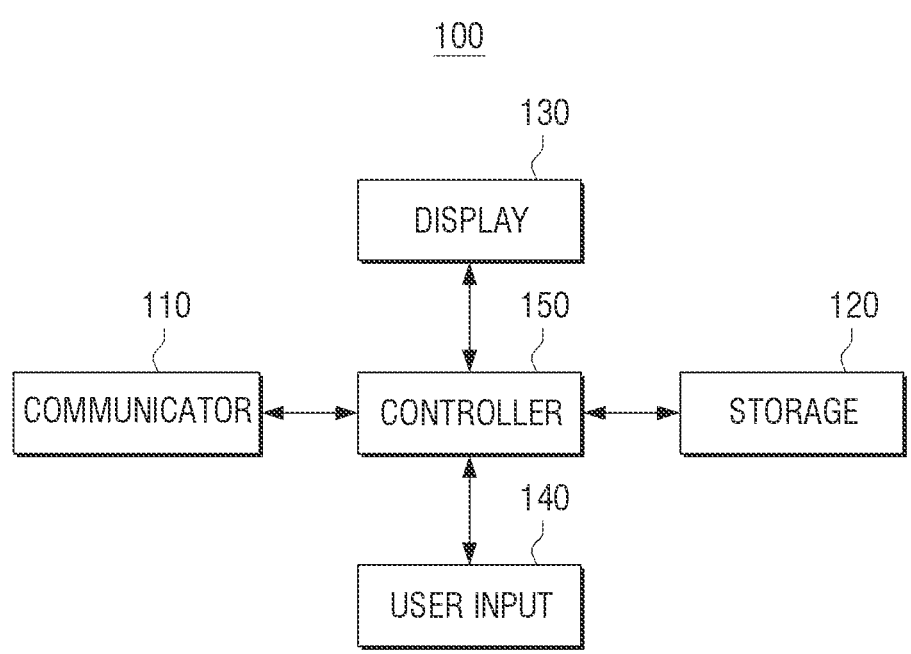
FIG. 12 is a block diagram of an electronic device, according to an embodiment of the present disclosure.

FIG. 12 is a block diagram of an electronic device according to an embodiment of the present disclosure.

Referring to FIG. 12, the electronic device 100 may include a communicator 110, a storage 120, a display 130, a user input 140 and a controller 150. The electronic device 100 according to an embodiment may be able to play back various contents and may be implemented as a smart phone, a tablet PC, a smart TV, and the like.

The electronic device 100 of FIG. 12 is equipped with elements to perform personal cloud service functions according to one example. Accordingly, the elements illustrated in FIG. 12 may be partially removed or altered, or other elements may be added, depending on embodiments.

The communicator 110 performs communication with the personal cloud apparatus 200, the home AP 300 and the external servers 510, 520, 530, 540. The communicator 110 may be implemented as at least one of the WiFi interface, the Bluetooth interface, the Zigbee interface, and the like to perform communication with the personal cloud apparatus 200. Further, the communicator 110 may use wireless communication to perform communication with an external server outside the house, and the wireless communication may use a communication specification such as IEEE, Zigbee, 3rd Generation (3G), 3rd Generation Partnership Project (3GPP), Long Term Evolution (LTE), and the like.

The storage 120 stores various data and software modules to control the electronic device 100. The storage 120 may particularly include a plurality of software modules 1420, 1421, 1422, 1423, 1424, 1425, and 1426 as the ones illustrated in FIG. 14, to register the personal cloud apparatus 200 to the registration server 530 and share various contents using the personal cloud apparatus 200.

The display 130 outputs image content under control of the controller 150. For example, the display 130 may display photo content, video content, and the like.

The display 130 may particularly display a UI to select one from among a plurality of searched personal cloud apparatuses 200, when the plurality of personal cloud apparatuses 200 are searched.

The user input 140 may receive a user command to control the electronic device 100. The user input 140 may particularly receive a user command to execute an application to register the personal cloud apparatus 200 to the registration server 530, and when a plurality of personal cloud apparatuses 200 are searched, receive a user command to select one from among the searched plurality of personal cloud apparatuses 200.

Meanwhile, the user input 140 may be implemented in the form of a touch screen, but is not limited thereto. Accordingly, the user input 140 may be implemented as a mouse, a pointing device, a motion input, a button, or many other input devices.

The controller 150 controls operations of the electronic device 100 according to the user command as inputted through the user input 140. The controller 150 may particularly perform a pairing operation with the personal cloud apparatus 200, and acquire information about an access point of the home AP 300 to connect the personal cloud apparatus 200 to the network and control the communicator 110 to transmit the acquired information to the personal cloud apparatus 200, when an application is executed. When the personal cloud apparatus 200 is connected to the network via the home AP 300, the controller 150 registers the personal cloud apparatus 200 to the registration server 530.

That is, the controller 150 causes the electronic device 100 to enter NFC mode in response to a user command. When the electronic device 100 is within a threshold distance to the personal cloud apparatus 200, i.e., when NFC tagging is performed, the controller 150 receives download information of an application, downloads the application based on the download information thereof, and stores the downloaded application to the storage 120. The controller 1501 may then perform loading and execution of the downloaded application, in response to a user command.

When the application is executed, the controller 150 determines whether it is in a login state with the authentication server 510 using a specific user account, and if not, may control the display 130 to display a login page.

When determining that it is in the login state with the authentication server 510, the controller 150 searches for an available communication interface, and performs a pairing operation with the personal cloud apparatus 200 through one of the searched communication interfaces. The available communication interface may be one of the Bluetooth interface, the WiFi interface, the Zigbee interface, and the like, and a method for performing a pairing operation with the personal cloud apparatus 200 via various interfaces is referred to the explanation provided above with reference to FIGS. 4 to 6.

When the controller 150 is paired with the personal cloud apparatus 200, the controller 150 controls the communicator 110 to transmit information of the home AP 300 (e.g., SSID or password of the home AP 300) to the personal cloud apparatus 200 so that the personal cloud apparatus 200 connects to the home AP 300.

When the personal cloud apparatus 200 connects to the home AP 300, the controller 140 registers the personal cloud apparatus 200 to the registration server 530.

For example, the controller 140 receives a MAC address, which is the unique information of the personal cloud apparatus 200, from the personal cloud apparatus 200 via the communicator 110. When the user account is logged in to the authentication server 510, the controller 150 is able to receive user account information from the authentication server 510 via the communicator 110. The user account information may include not only a user ID or a password, but also token information and token secret information.

To register the personal cloud apparatus 200 to the registration server 530, the controller 150 may transmit the user account information and the MAC address to the registration server 530. When the personal cloud apparatus 200 is registered to the registration server 530 using the user account information and the MAC address, the controller 150 receives, from the registration server 510, the domain information and the peer ID information of the network server 540 to which the personal cloud apparatus 200 can connect, and controls the communicator 110 to transmit the received domain information and peer ID information to the personal cloud apparatus 200.

The personal cloud apparatus 200 is registered to the registration server 530 based on the user account, and when a plurality of user accounts register the same personal cloud apparatus 200 to the registration server 530, a plurality of electronic devices using the plurality of user accounts can share the contents via the personal cloud apparatus 200.

Figure 13:
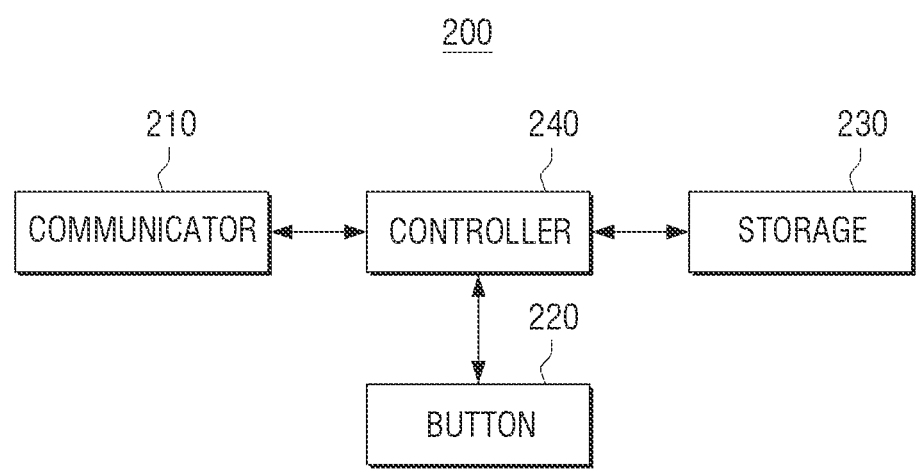
FIG. 13 is a block diagram of a personal cloud apparatus, according to an embodiment of the present disclosure.

FIG. 13 is a block diagram of a personal cloud apparatus according to an embodiment of the present disclosure.

Referring to FIG. 13, the personal cloud apparatus 200 may include a communicator 210, a button 220, a storage 230 and a controller 240.

The communicator 210 may perform communication with the electronic device 100 and the home AP 300. To perform communication with the electronic device 100 and the home AP 300, the communicator 210 may use at least one of the NFC interface, the WiFi interface, the Bluetooth interface, the Zigbee interface, and the like.

The button 220 may receive a user command. The button 220 may particularly receive a user command for the pairing with the electronic device 100.

The storage 230 stores various data and software modules to control the personal cloud apparatus 200. The storage 230 may particularly include a plurality of software modules 1401, 1402, 1403, 1404, 1405, 1406, 1407, 1408, 1409, 1410, 1411, 1412, 1413, 1414, and 1415 as the ones illustrated in FIG. 14, to register the personal cloud apparatus 200 to the registration server 530 and share various contents using the personal cloud apparatus 200.

The controller 240 controls the overall operation of the personal cloud apparatus 200. For example, when the button 200 is selected, the controller 240 may perform pairing with the electronic device 100 via one of the various communication interfaces. The method for performing the pairing operation using various communication interfaces is referred to in the explanation provided above with reference to FIGS. 4 to 6, and a redundant explanation will be omitted for the sake of brevity.

When paired with the electronic device 100, the controller 240 receives information of the home AP 300 (e.g., SSID or password of the home AP 300) from the electronic device 100 via the communicator 210, and performs a connecting operation to the home AP 300 using the received information about the home AP 300. To register the personal cloud apparatus 200 to the registration server 530, the controller 240 may transmit MAC address information to the electronic device 100 via the communicator 210.

When the personal cloud apparatus 200 is registered to the registration server 530, the controller 240 connects to the network server 540 based on the domain information and peer ID received from the electronic device 100 so that at least one electronic device 100 shares contents.

Figure 14:
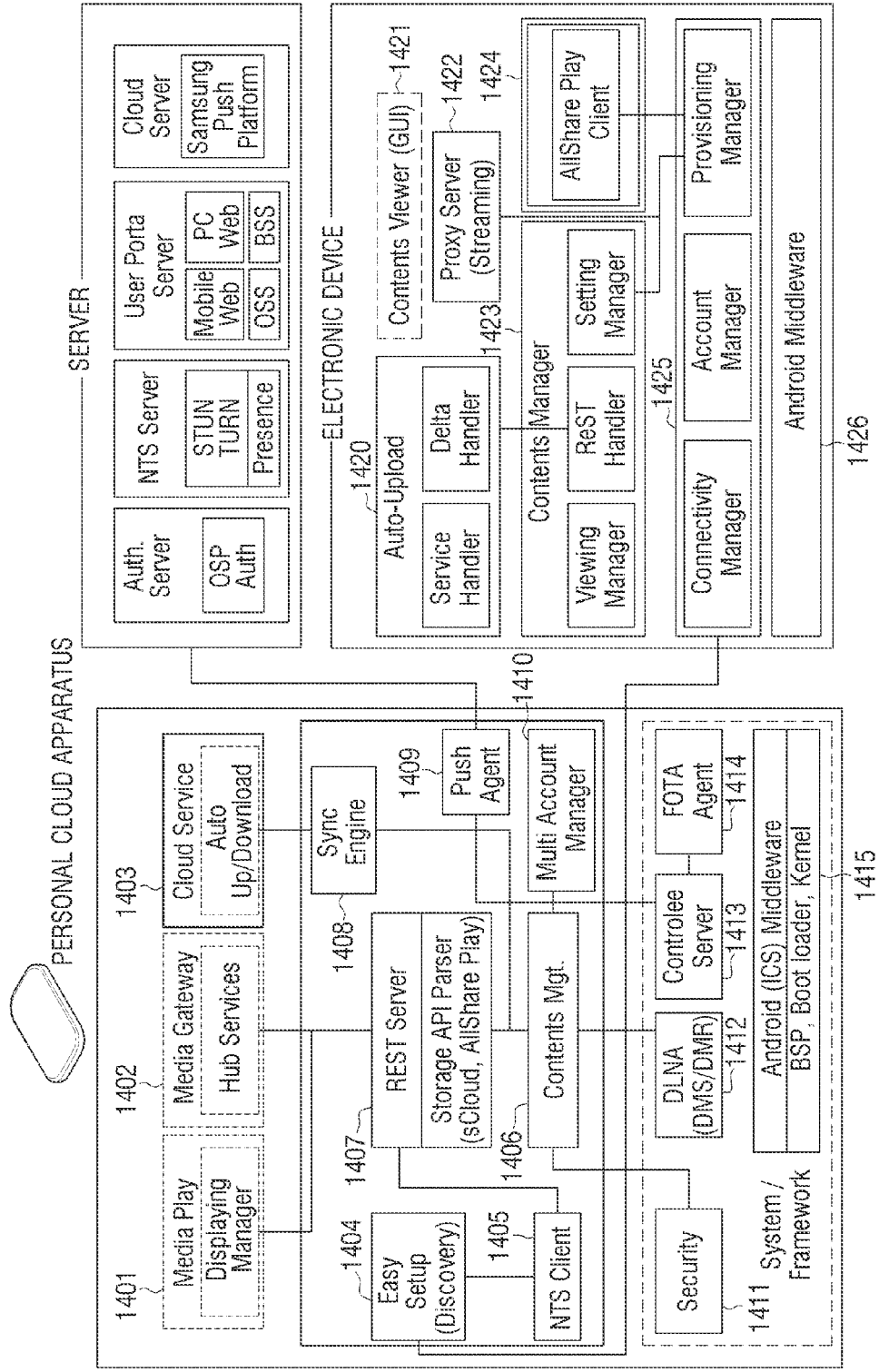
FIG. 14 is a soft module configuration of a personal cloud system, according to an embodiment of the present disclosure.

FIG. 14 is a soft module configuration of a personal cloud system, according to an embodiment of the present disclosure.

Referring to FIG. 14, the personal cloud apparatus 200 stores a media play module 1401, a media gateway module 1402, a cloud service module 1403, an easy setup module 1404, an NTS client module 1405, a contents MGT module 1406, a rest server module and storage API parser module 1407, a sync engine module 1408, a push agent module 1409, a multi account manager module 1410, a security module 1411, a DLNA module 1412, a controlee server module 1413, a FOTA agent module 1414, and a middleware module and BSP, kernal, boot loader module 1415.

The middleware module and BSP, kernal, boot loader module 1415 boots up the system, manages a file system, and sets up a system firmware such as network setup or graphic setup. The security module 1411 involves content encryption/decryption and setup of access to the content. The DLNA module 1412 processes a multimedia standard protocol for content sharing. The controlee server module 1413 receives a remote control command of a client. The FOTA agent module 1414 manages firmware update of the personal cloud apparatus 200.

The easy setup module 1404 manages a communication protocol with the electronic device 100 to register the personal cloud apparatus 200 to the registration server 530. The NTS client module 1405 manages connection to the network server 540 based on a peer ID. The contents MGT module 1406 controls an interface with a media player for playing stored contents. The REST server module and storage API parser module 1407 receive a command transmission format such as content playback and process the same, analyze the API of the message requested through the server and handle the contents, and play a role of a classifier which handles the contents by classifying these into sharing and private regions. The sync engine module 1408 maintains content synchronization between the open cloud server 520 and the client. The push agent module 1409 plays a role of notifying updates such as changes in contents, changes in a user account list, etc. The multi account manager module 1410 manages a plurality of user accounts.

The media play module 1401 performs a function of playing contents through an output device (e.g., smart TV). The media gateway module 1402 performs a function of content hub such as music and video. The cloud service module 1403 manages setup of automatic content upload and download.

On the server's end, there are an authentication server (Auth. Server), an NTS, a registration server (user portal server) and an open cloud server.

The electronic device 100 may include an auto upload module 1420, a contents viewer module 1421, a proxy server module 1422, a contents manager module 1423, an allshare play client module 1424, an easy setup solution module 1425, and an android middleware module 1426.

The android middleware module 1426 involves system booting and file system management, and sets up a system firmware such as network setup or graphic setup.

The easy setup solution module 1425 handles setup of a network such as WiFi or Bluetooth, and includes a connectivity manager module which identifies a network type when connected to the personal cloud apparatus 200, an account manager module which manages a user account to register the personal cloud apparatus 200, and a provisioning manager module which registers the personal cloud apparatus 200 to the registration server 530, the authentication server 510 and the network server 540.

The allshare play client module 1424 plays a role of an interface with a compatible application which can access the personal cloud apparatus 200.

The contents manager module 1423 includes a viewing manager module which manages playing and control of the content on the electronic device 100, a rest handler module which remotely transmits a request for playing content of the personal cloud apparatus 200, and a setting manager module which manages setup of automatic upload and download.

The proxy server module 1422 manages transmission of the information with the player installed on the electronic device 100, when the content is played.

The contents viewer module 1421 generates a Graphic User Interface (GUI) to play the content.

The auto upload module 1420 includes a service handler module which sets up automatic or manual upload and manages intervals of executing the same, and a delta handler module which manages new information of the updated content.

Accordingly, the electronic device 100 and the personal cloud apparatus 200 are able to share the contents stored in the personal cloud apparatus 200, inside or outside the house, using the software module as the one explained above.

A program code to execute the method for registering the personal cloud apparatus 200 according to various embodiments may be stored in various types of recording media. For example, the program code may be stored in various types of terminal-readable recording media such as, for example, Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, or CD-ROM.

While the present disclosure has been shown and described with reference to various embodiments thereof, it will be understood by those skilled in the art that various changes in form and details may be made therein without departing from the spirit and the scope of the present disclosure as defined by the appended claims and their equivalents.

What is claimed is:

1. A method of an electronic device for registering a personal cloud apparatus, the method comprising:
pairing the electronic device with the personal cloud apparatus when an application is executed on the electronic device;
acquiring, at the electronic device, information about an access point;
transmitting, by the electronic device, the information about the access point to the personal cloud apparatus to connect the personal cloud apparatus to a network via the access point; and
registering the personal cloud apparatus with a registration server when the personal cloud apparatus is connected to the network via the access point,
wherein the pairing comprises:
performing a discovery operation to search for personal cloud apparatuses existing within a threshold distance of the electronic device,
receiving MAC address information from the personal cloud apparatus,
in response to a request for pairing with the searched personal cloud apparatus inputted from a user, setting a channel to perform communication with the searched personal cloud apparatus,
transmitting a request signal for connection to the personal cloud apparatus via the channel, and
receiving a response signal in response to the request signal.

2. The method of claim 1, further comprising:
entering a Near Field Communication (NFC) mode in response to a user command;
when the electronic device is within a threshold distance of the personal cloud apparatus, receiving download information of the application using NFC; and
downloading the application based on the download information of the application.

3. The method of claim 1, wherein the pairing comprises:
determining whether the electronic device is in a login state with an authentication server using a specific user account;
searching available communication interfaces for the pairing with the personal cloud apparatus when determining that the electronic device is in the login state with the authentication server; and
pairing with the personal cloud apparatus via one of the searched communication interfaces.

4. The method of claim 3, wherein the available communication interfaces comprise at least one of a Bluetooth interface, a WiFi interface and a Zigbee interface.

5. The method of claim 1, wherein the pairing comprises:
receiving Service Set IDentifier (SSID) information when the SSID of the personal cloud apparatus is broadcast via the personal cloud apparatus;
generating encryption information with a Hash algorithm using the SSID information and MAC address information of the personal cloud apparatus; and
pairing with the personal cloud apparatus based on the SSID information and the encryption information.

6. The method of claim 1, wherein the transmitting comprises transmitting Service Set IDentifier (SSID) information and encryption information of an access point currently used by the electronic device.

7. The method of claim 1, wherein the registering comprises:
receiving MAC address information from the personal cloud apparatus;
receiving user account information from an authentication server when the user account is logged in to the authentication server;
transmitting the user account information and the MAC address information to the registration server to register the personal cloud apparatus;
when the personal cloud apparatus is registered to the registration server using the user account information and the MAC address information, receiving from the registration server domain information and peer Identification (ID) information of a network server to which the personal cloud apparatus can connect; and transmitting the received domain information and peer ID information to the personal cloud apparatus.

8. The method of claim 7, wherein the personal cloud apparatus is connected to an external network via the network server using the received domain information and peer ID information, and the peer ID information corresponds to MAC address information of the personal cloud apparatus.

9. The method of claim 1, wherein the registering comprises registering the personal cloud apparatus to the registration server based on a user account, wherein when a plurality of user accounts register the same personal cloud apparatus to the registration server, a plurality of electronic devices using the plurality of user accounts share the personal cloud apparatus.

10. An electronic device comprising:

A transceiver configured to perform communication with a personal cloud apparatus and an external server;

a storage; and a controller configured to:
pair the electronic device with a personal cloud apparatus when an application is executed on the electronic device,
acquire information of an access point to connect the personal cloud apparatus to a network,
control the transceiver to transmit the acquired information to the personal cloud apparatus when an application is executed, and
register the personal cloud apparatus to a registration server when the personal cloud apparatus is connected to the network via the access point, wherein, for the pairing with the personal cloud apparatus via a Bluetooth interface, the controller is further configured to:
perform a discovery operation to search for personal cloud apparatuses existing within a threshold distance of the electronic device,
receive MAC address information from the searched personal cloud apparatus,
in response to a request for pairing with the searched personal cloud apparatus inputted from a user, set a channel to perform communication with the searched personal cloud apparatus,
transmit a request signal for connection to the personal cloud apparatus via the channel, and
control the transceiver to receive a response signal in response to the request signal.

11. The electronic device of claim 10, wherein the controller is further configured to:
cause the electronic device to enter a Near Field Communication (NFC) mode in response to a user command,
when the electronic device is within a threshold distance of the personal cloud apparatus, receive download information of the application using the NFC, and
download the application based on the download information of the application and store the application at the storage.

12. The electronic device of claim 10, wherein the controller is further configured to:
determine whether it is in a login state with an authentication server using a specific user account,
when it is in the login state with the authentication server, to perform pairing with the personal cloud apparatus, search available communication interfaces, and
pair with the personal cloud apparatus via one of the searched communication interfaces.

13. The electronic device of claim 12, wherein the available communication interfaces comprise at least one of a Bluetooth interface, a WiFi interface and a Zigbee interface.

14. The electronic device of claim 10, wherein, for the pairing with the personal cloud apparatus via a WiFi interface, the controller is further configured to:
receive Service Set IDentifier (SSID) information via the communicator transceiver when the SSID of the personal cloud apparatus is broadcast via the personal cloud apparatus,
generate encryption information with a Hash algorithm using the SSID information and MAC address information of the personal cloud apparatus, and
pair with the personal cloud apparatus based on the SSID information and the encryption information.

15. The electronic device of claim 10, wherein the controller is further configured to control the transceiver to transmit Service Set IDentifier (SSID) information and encryption information of an access point currently used by the electronic device to the personal cloud apparatus.

16. The electronic device of claim 10, wherein the controller is further configured to:
receive MAC address information from the personal cloud apparatus,
when the user account is logged in to an authentication server, receive user account information from the authentication server,
transmit the user account information and the MAC address information to the registration server to register the personal cloud apparatus,
when the personal cloud apparatus is registered to the registration server using the user account information and MAC address information, receive domain information and peer Identification (ID) information of a network server to which the personal cloud apparatus can connect, and
control the transceiver to transmit the received domain information and peer ID information to the personal cloud apparatus.

17. The electronic device of claim 16,
wherein the personal cloud apparatus is connected to an external network via the network server using the received domain information and peer ID information, and
wherein the peer ID information corresponds to MAC address information of the personal cloud apparatus.

18. The electronic device of claim 10,
wherein the personal cloud apparatus is registered to the registration server based on a user account, and
wherein when a plurality of user accounts register the same personal cloud apparatus to the registration server, a plurality of electronic devices using the plurality of user accounts share the personal cloud apparatus.

19. A method of a personal cloud system for registering a personal cloud apparatus to a registration server, the method comprising:
pairing an electronic device with the personal cloud apparatus when an application of the electronic device is executed and a button of the personal cloud apparatus is selected;

acquiring, at the electronic device, information of an access point from the access point, to connect the personal cloud apparatus to a network;

transmitting, at the electronic device, the information of the access point to the personal cloud apparatus;

connecting, at the personal cloud apparatus, to the access point using the information of the access point;

transmitting, at the electronic device, user account information and information of the personal cloud apparatus to the registration server, to register the personal cloud apparatus to the registration server; and registering, at the registration server, the personal cloud apparatus, and transmitting domain information and peer ID information of a network server to which the personal cloud apparatus can connect, to the electronic device, wherein the pairing comprises:
  performing a discovery operation to search for personal cloud apparatuses existing within a threshold distance of the electronic device,
  receiving MAC address information from the personal cloud apparatus,
  in response to a request for pairing with the searched personal cloud apparatus inputted from a user, setting a channel to perform communication with the searched personal cloud apparatus,
  transmitting a request signal for connection to the personal cloud apparatus via the channel, and
  receiving a response signal in response to the request signal.

20. A method for registering a personal cloud apparatus to a registration server, the method comprising:
  pairing the personal cloud apparatus with an electronic device when a button provided on the personal cloud apparatus is selected;
  receiving, at the personal cloud apparatus, information of an access point from the electronic device;
  connecting, by the personal cloud apparatus, to the access point using the information of the access point; and
  transmitting, by the personal cloud apparatus, MAC address information to the electronic device to register the personal cloud apparatus to the registration server,
  wherein the pairing comprises:
    performing a discovery operation to search for personal cloud apparatuses existing within a threshold distance of the electronic device,
    receiving MAC address information from the personal cloud apparatus,
    in response to a request for pairing with the searched personal cloud apparatus inputted from a user, setting a channel to perform communication with the searched personal cloud apparatus,
    transmitting a request signal for connection to the personal cloud apparatus via the channel, and
    receiving a response signal in response to the request signal.

* * * * *